Figure 1:
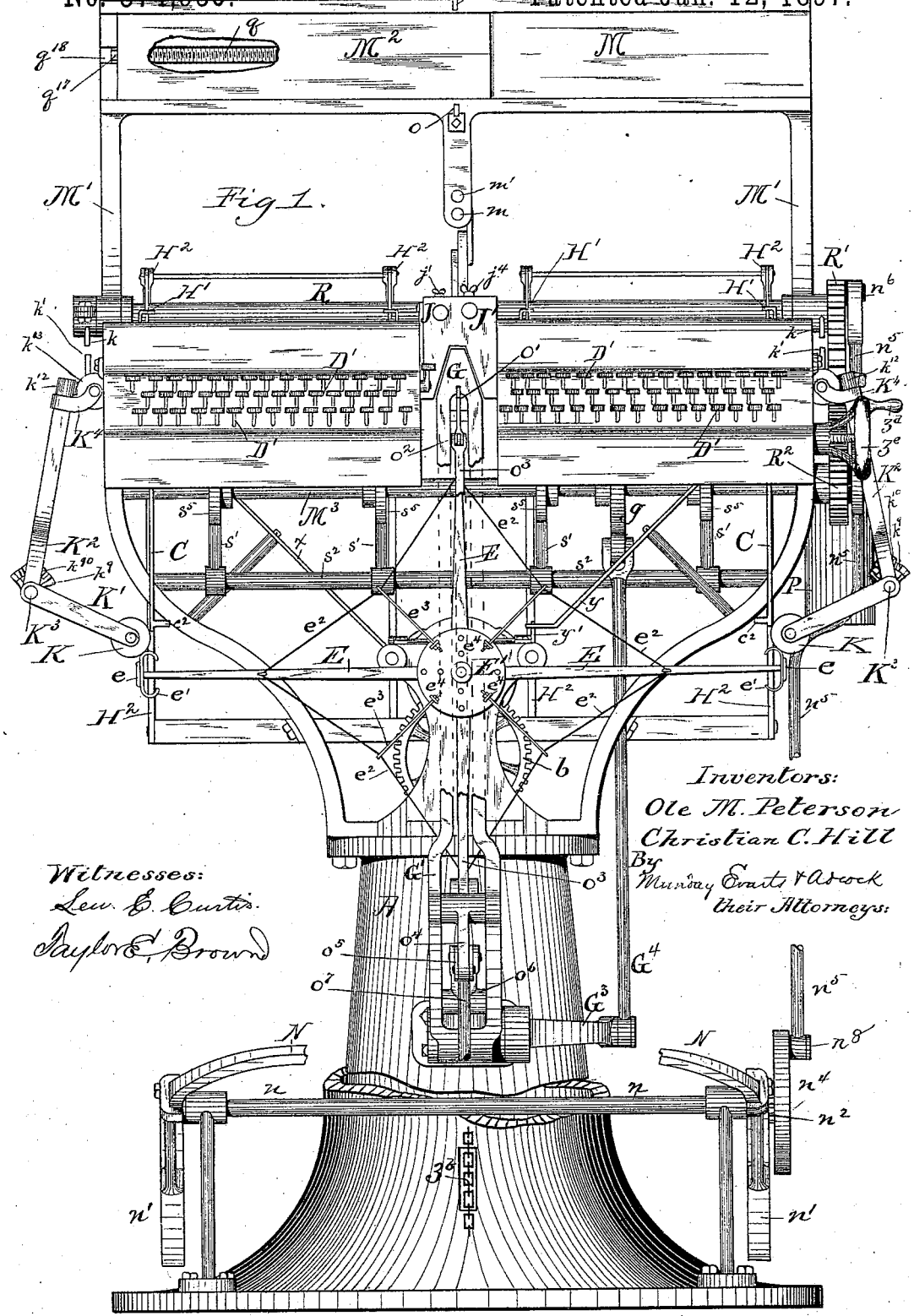

(No Model.) 10 Sheets—Sheet 2.
O. M. PETERSON & C. C. HILL.
MACHINE FOR SETTING AND DISTRIBUTING TYPE AND PRODUCING IMPRESSIONS THEREFROM.

No. 574,936. Patented Jan. 12, 1897.

Witnesses:
Lew. E. Curtis.
Taylor E. Brown

Inventors:
Ole M. Peterson
Christian C. Hill
By Munday Evarts & Adcock
their Attorneys.

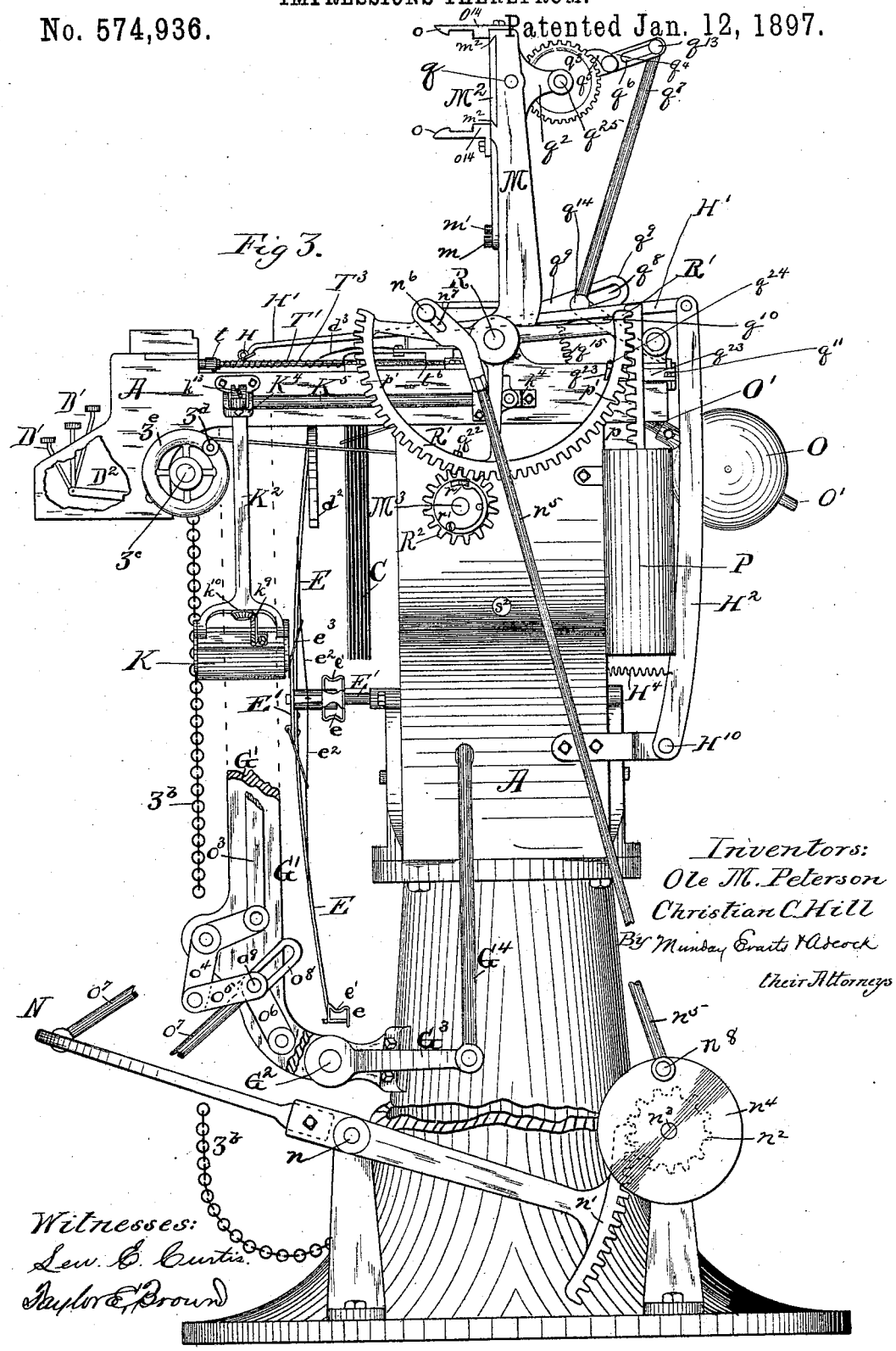

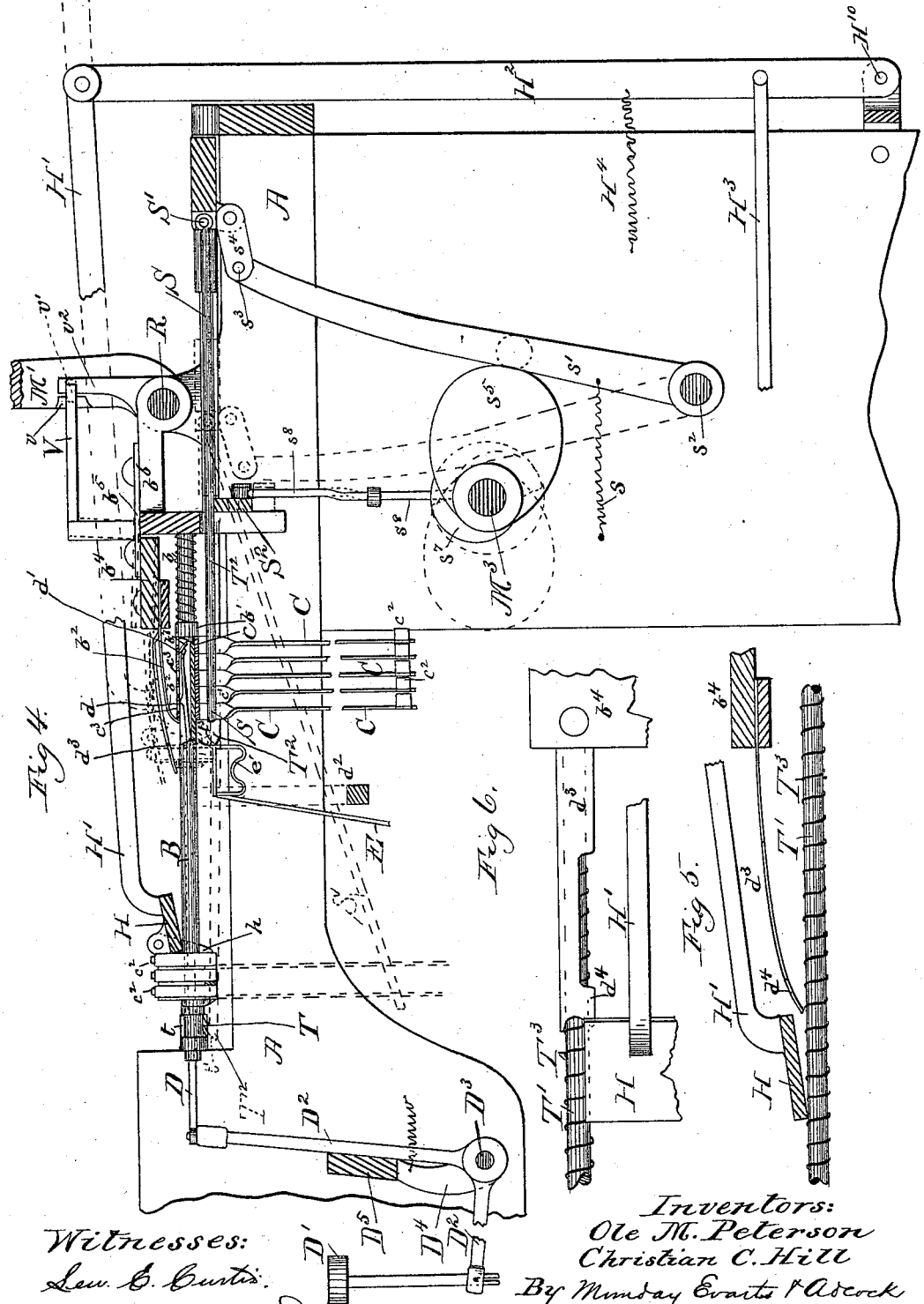

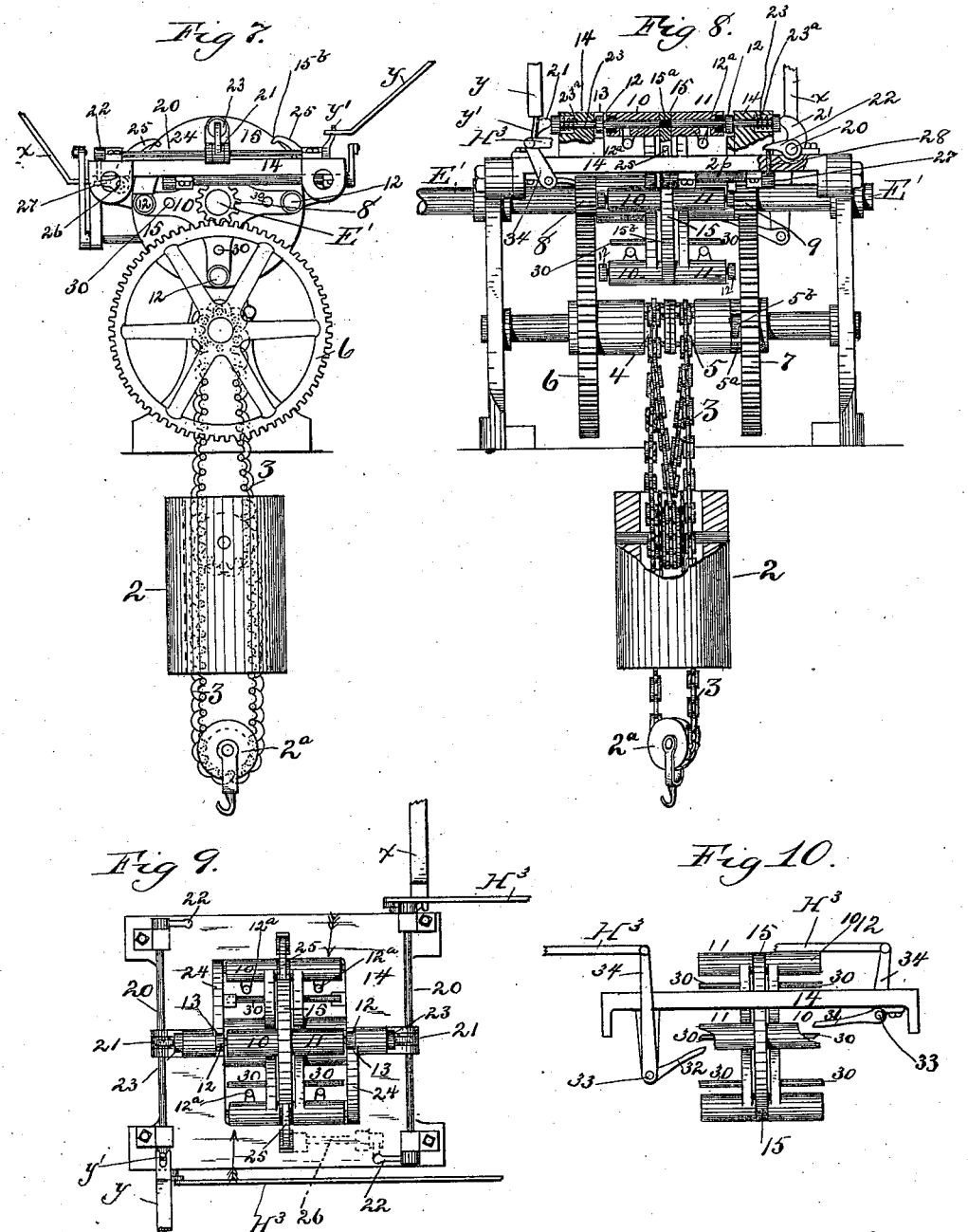

(No Model.) 10 Sheets—Sheet 6.

O. M. PETERSON & C. C. HILL.
MACHINE FOR SETTING AND DISTRIBUTING TYPE AND PRODUCING IMPRESSIONS THEREFROM.

No. 574,936. Patented Jan. 12, 1897.

Witnesses:
Lew. E. Curtis.
Taylor E. Brown

Inventors:
Ole M. Peterson
Christian C. Hill
By Munday Evarts & Adcock
their Attorneys (No Model.) 10 Sheets—Sheet 7.
O. M. PETERSON & C. C. HILL.
MACHINE FOR SETTING AND DISTRIBUTING TYPE AND PRODUCING IMPRESSIONS THEREFROM.
No. 574,936. Patented Jan. 12, 1897.
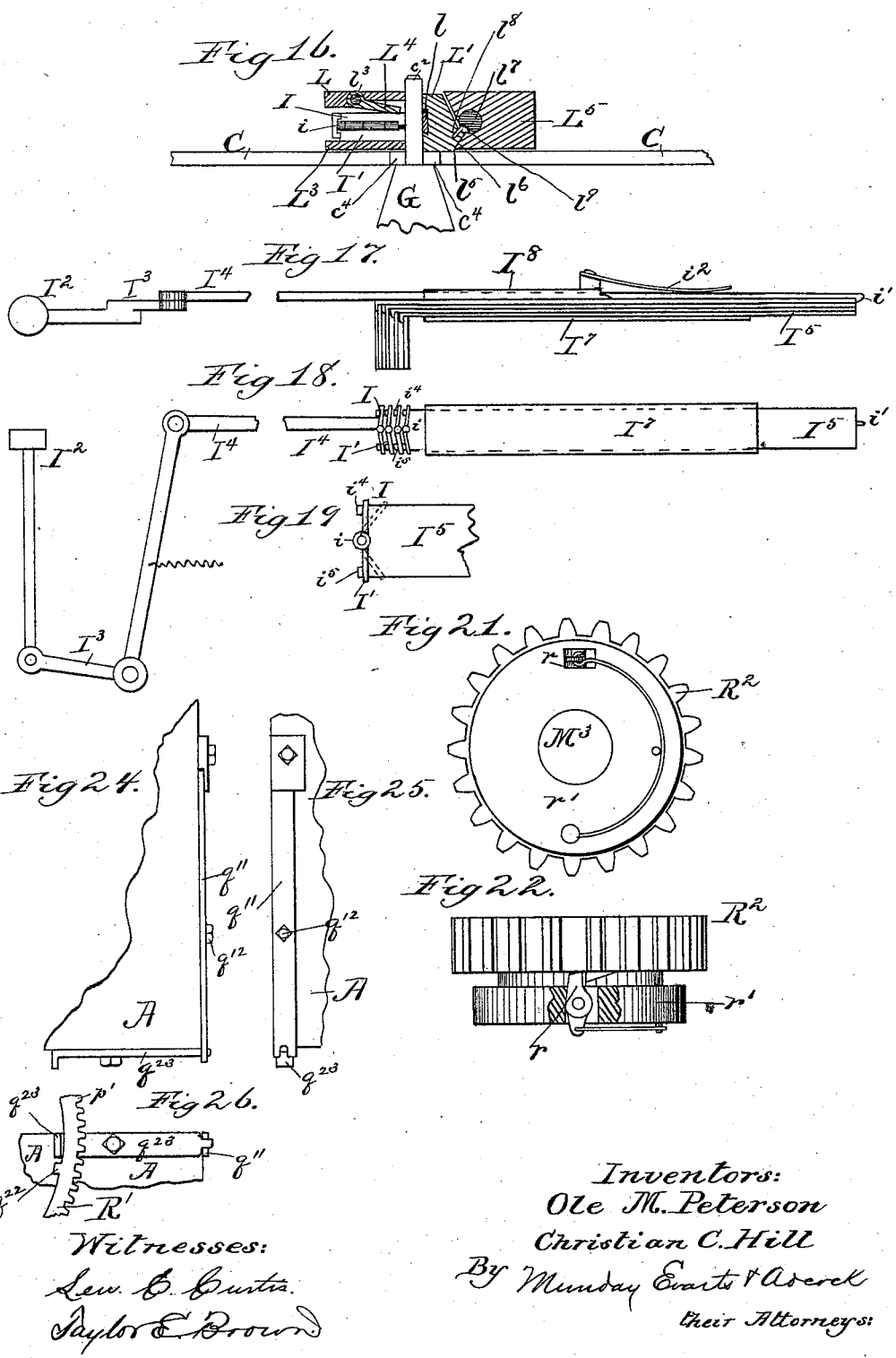
Witnesses:
Lew. E. Curtis.
Taylor E. Brown.
Inventors:
Ole M. Peterson
Christian C. Hill
By Munday Evarts & Adcock
their Attorneys.

(No Model.) 10 Sheets—Sheet 8.
O. M. PETERSON & C. C. HILL.
MACHINE FOR SETTING AND DISTRIBUTING TYPE AND PRODUCING IMPRESSIONS THEREFROM.
No. 574,936. Patented Jan. 12, 1897.
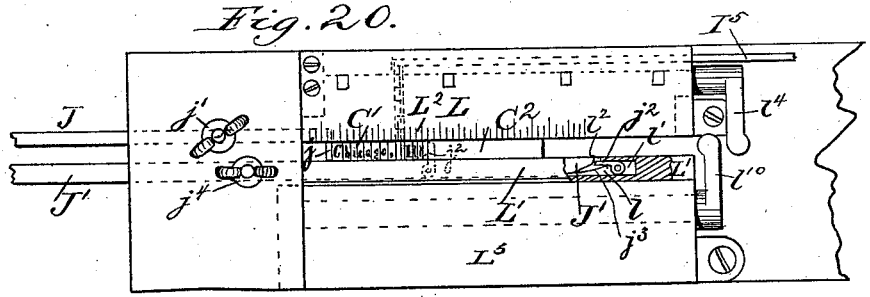
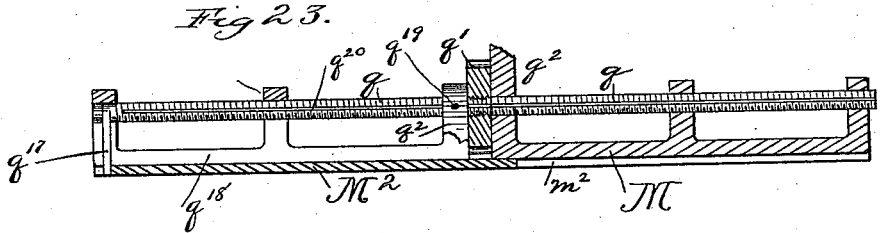
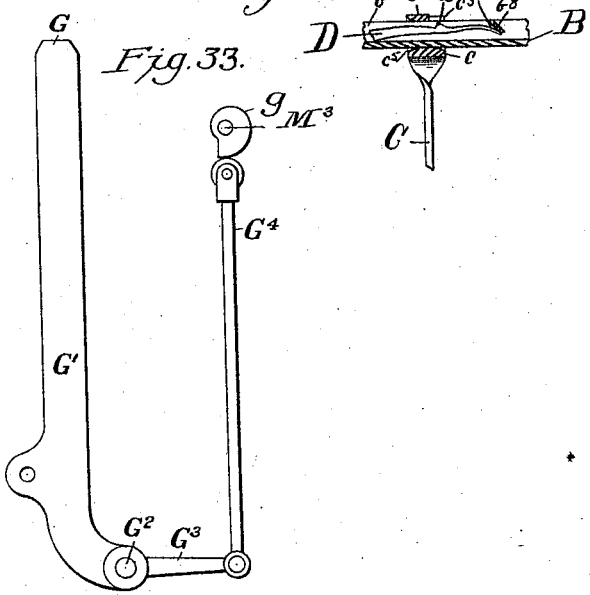
Witnesses:
Lew. E. Curtis.
Taylor E. Brown
Inventors:
Ole M. Peterson
Christian C. Hill
By Munday Evarts & Adcock
their Attorneys (No Model.) 10 Sheets—Sheet 9.
O. M. PETERSON & C. C. HILL.
MACHINE FOR SETTING AND DISTRIBUTING TYPE AND PRODUCING IMPRESSIONS THEREFROM.
No. 574,936. Patented Jan. 12, 1897.
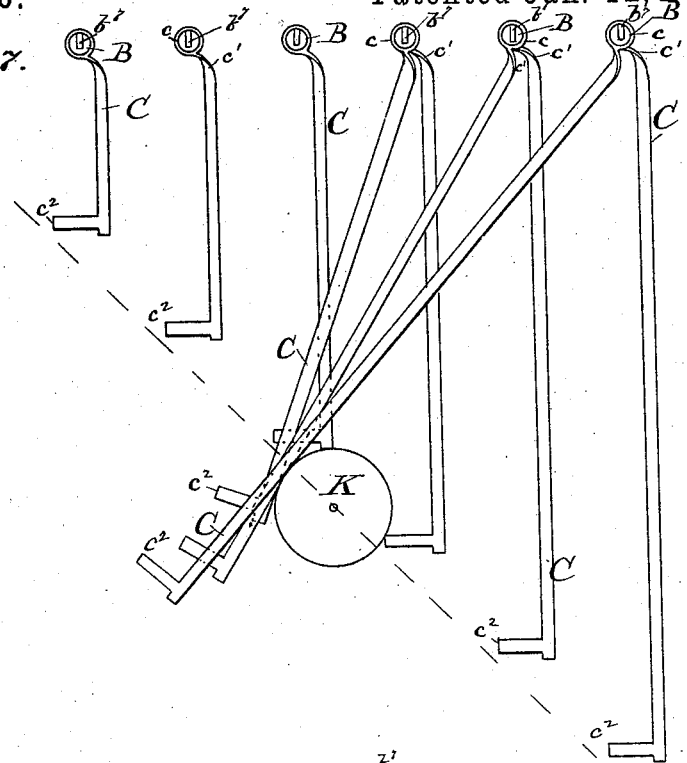
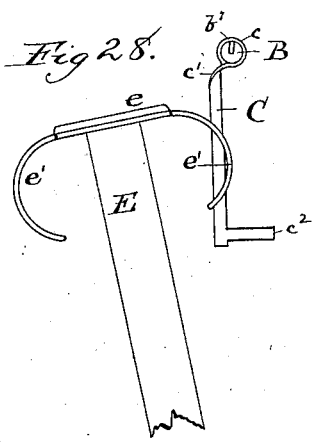
Witnesses:
Lew. E. Curtis.
Taylor E. Brown
Inventors:
Ole M. Peterson
Christian C. Hill
By Munday Evarts & Adcock
their Attorneys:

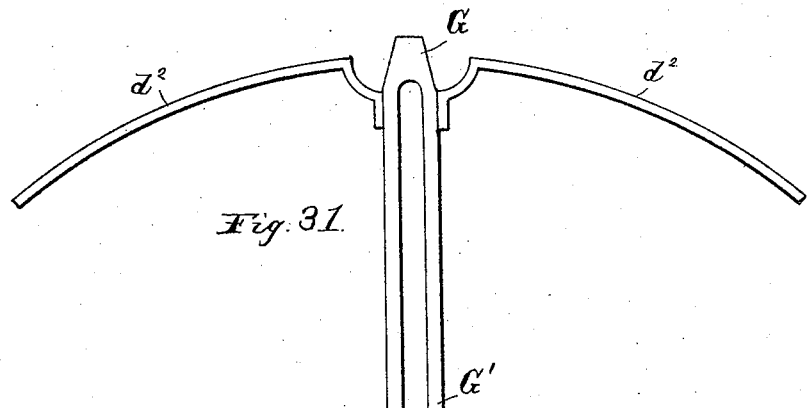
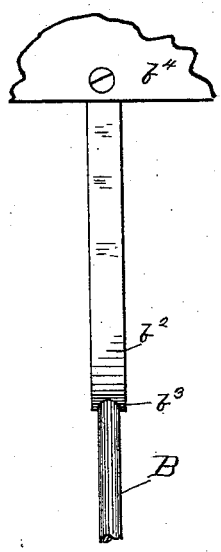
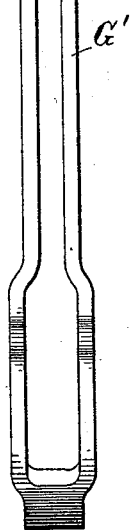

UNITED STATES PATENT OFFICE.

OLE M. PETERSON AND CHRISTIAN C. HILL, OF CHICAGO, ILLINOIS.

MACHINE FOR SETTING AND DISTRIBUTING TYPE AND PRODUCING IMPRESSIONS THEREFROM.

SPECIFICATION forming part of Letters Patent No. 574,936, dated January 12, 1897.

Application filed March 22, 1886. Serial No. 196,062. (No model.)

*To all whom it may concern:*

Be it known that we, OLE M. PETERSON, a subject of the King of Sweden and Norway, and CHRISTIAN C. HILL, a citizen of the United States, residing in Chicago, in the county of Cook and State of Illinois, have invented a new and useful Improvement in Machines for Setting and Distributing Printing-Types and for Producing Impressions Therefrom, of which the following is a specification.

This invention relates to that class of type-setting machines wherein a limited number of type are employed and set up line by line, an impression being taken from each successive line as it is set up and the type then distributed before another line is set up.

In our invention a requisite number of each kind of type are secured to a series of type-arms mounted pivotally on a series of stationary parallel rods, on which they may slide longitudinally. As all the type of the same kind or letter are mounted on the same rod, the type will automatically distribute themselves, when released or not in use, by simply swinging into a vertical position from their pivotal support or rod. The rods on which the different sets of type-arms are mounted are all arranged parallel to each other and in the same plane. The direction of the line of type when set up is parallel with these rods or at right angles to the type-arms, and each set of type-arms is consequently of different length, but all the type-arms of the same set are of course of the same length. The type-arms all have two kinds of movements, one a swinging or pivotal movement on its rod to bring the face of the type into a horizontal position and the other a longitudinal movement on its rod to bring the type into its proper position in the line. When the type are distributed or not in use, all the type-arms of each set are assembled at the rear end of their supporting-rod and there held by a spring-pawl or other equivalent device, against which they are pressed by means of a spring, preferably a spiral one, mounted on the rear end of the supporting-rod. This spring serves always to press the forward type-arm into position against the spring-pawl whatever may be the number of type-arms back of the spring-pawl; that is to say, as each type-arm is pulled forward for use this spring pushes the remaining type-arms ahead, so that the next type-arm is then in position to be pulled forward for use. The type-arms are pulled forward in turn as required for use from behind the spring-pawl by means of a reciprocating hook or equivalent device actuated from the key, and which engages the forward type-arm and pulls it forward on its rod from beneath the spring-pawl and into position to be raised or swung up so as to bring the face of the type horizontal. The type-arm is then swung up by means of a movable or rotary sweeper or elevating device actuated by or from the same movement of the key. The type-arm is next moved forward longitudinally to bring the type into its proper position in the line, one end of course being supported by the rod on which it is pivoted and the other end by means of a movable support or bed which stands on about a level with the sweeper and in juxtaposition therewith when the sweeper is moved or turned so as to bring the type-arm into its horizontal position. The forward or longitudinal movement of the type-arms is effected by a reciprocating pushing-bar arranged, preferably, just above the parallel type-arm-supporting rods and which is provided with a number of pivoted fingers or pawls projecting between the parallel supporting-rods, which fingers engage the type-arm extending horizontally beneath the rods. These fingers are pivoted to the pushing-bar so that when the pushing-bar moves back the fingers may drop over the type-arm into position for pushing the same forward when the forward movement is given to the pushing-bar. This pushing-bar is also actuated from the same movement of the key by suitable intermediate mechanism.

Each type-arm has a short offset or bend near its eye to permit of its being swung into a horizontal position, so as to lie immediately under the parallel rods and transversely thereto. We may provide the eye of each type-arm with a slight notch or offset for the reciprocating hooked arm to engage with, so as to pull it forward from beneath the spring-pawl. After a complete word has been in this way set up by depressing the appropriate keys in their order an automatically-adjustable spacing device is next inserted in the line by depressing a key and another word then set up until the line is completed, a spacing device being inserted between each two words. The length of the line is then fixed by pulling a locking-bar into the proper position at the end of the line, according to the width of the column or page wherein the line is to form a part.

The automatic spacing devices which we have invented and employ between the words consist each of a pair of hinged leaves which stand between the type with their pivot or joint near the middle thereof and which operate as a knee-joint lever when pressure is applied on the bottom and top edges of said hinged leaves, thus causing them to spread the adjacent type between the words and force the type of each word snugly together. As these spacing devices between the words are all alike, it is obvious that an equal space will be produced between all the words in the line, whatever may be the total amount of slack space in the line. An equal pressure is applied to each of the spacing devices in the line by depressing a horizontal bar at one side of the line which projects over the edge of the hinged leaves. After or at the same time the spaces between the words of the line are in this way justified the line is straightened by forcing a movable straightening-bar on one side of the line against a stationary or movable straightening-bar on the opposite side thereof. This movable straightening-bar has also a vertical movement to make the face of the type even by pressing down upon all the type-arms in the line, which rest upon a bed or support. The impression is next taken on a suitable matrix, which is secured to an adjustable plate mounted on a movable impression-bed and pressed down upon the type in the line. As the impression-bed moves back after taking the impression the impression-plate is automatically moved the space of one line, so that the matrix will be in proper position for the next line when it is set up. After the impression has been taken the type-arms are permitted to swing back into the vertical position and thus redistribute themselves by simply removing the bed or support on which they rest; but in order to prevent the type-arms from entangling and swinging to and fro like pendulums from their supporting-rods we provide a movable rest or roller which is brought under the type-arms before their supporting-bed is removed, and which rest or roller is gradually lowered with the type-arms resting thereon, preferably on a line of about forty-five degrees from the vertical, so that each type-arm will rest on the roller until it reaches the vertical position, and thus have no tendency to vibrate.

Another feature of the invention consists in making this movable rest in the form of a roller, of such diameter as to always keep the longer type-arms below the upwardly-projecting ends of the type on the shorter type-arms, and thus prevent the same crossing and becoming entangled. As a further precaution to prevent the type-arms entangling we provide a series of fingers or dividers which are moved forward between the several sets of type-arms after they reach the vertical position and before they are moved back to their original position at the rear ends of their supporting-rods. A reciprocating pusher-bar next pulls the type-arms altogether back to their original position under the spring-pawls, which are elevated slightly to permit the type-arms to pass under the same and are again let down before the pusher-bar recedes.

In order to make the machine more compact and obviate the necessity of employing type-arms of great length, we arrange part of them on each side of the line, so that the type-arms on each side of the machine are swung in opposite directions to bring their type into the line. The sweeper or sweepers which we employ to elevate the type-arms therefore move in opposite directions when keys on different sides of the line are depressed. The type-arms on one side of the line are provided with heels or projections beyond the type for the vertically-moving bar which levels the face of type to bear upon.

As the force required to give the necessary movements to the different parts of the machine is greater than can be rapidly, conveniently, and successfully exerted by the operator upon the keys with his fingers, we operate the sweepers which elevate the type-arms, and the pushing-bars that move the type longitudinally into position in the line, by power which may be applied in any suitable manner, but preferably by a spring or weight, the depression of the key serving simply to put such power in operation.

The impression-bed is pivoted by suitable arms or frame-pieces to a transverse shaft and is operated by a treadle or foot-lever, two kinds of connecting mechanism being employed, one operating to swing the impression-bed down quickly from its vertical position to near the face of the type and the other mechanism, consisting, preferably, of toggle-levers, operating to force the impression-bed down slowly, but with great pressure, upon the type to take the impression.

The impression-bed is swung back by means of a weight secured to an arm on the opposite side of the impression-bed shaft, and this weight is made heavy enough to operate the main cam-shaft of the machine as the impression-bed is elevated, said cam-shaft being connected by suitable gears or mechanism with the impression-bed shaft. Suitable cams on this cam-shaft thus operated communicate their proper movements in their appropriate times or order to the movable bed or support upon which the type rest when the impression is taken, to the pulling-bar by which the type-arms are brought back to their original position after being used in the line, and to the fingers which separate the different sets of type as they are moved back.

The bar which operates the spacing devices is automatically actuated directly from the impression-bed, as it makes its downward movement, by a suitable projection thereon striking against a crank-arm on or connected with said bar, and the straightening-bar on the opposite side of the line is operated in a similar manner both to straighten the line and level the face of the type. Proper movement is also imparted to the rest or roller which gradually lowers the type-arms from the impression-bed through suitable connecting mechanism. As the impression-bed is elevated a projection thereon also elevates the spring-pawls, so that the type-arms may be slipped back of the same into their original position. The locking-bars at the end of the line are adjusted and fixed in position by hand in the machine we have shown in the accompanying drawings, but the locking-bars may also be operated automatically if preferred. The mechanism for giving the side movement to the matrix-plate on the bed is actuated also automatically by the upward movement of the impression-bed.

Our invention primarily consists in the various novel devices and novel combinations of devices or operating parts by means of which the several functions of the machine are performed and its general or final result accomplished; and so far as these principal features of the invention are concerned the particular mechanisms or means employed to give to the various devices or operating parts their requisite movements are not important, and other suitable means or mechanisms for actuating such devices or operating parts may be used without departing from the essential nature and principle of our invention or machine.

Our invention also, however, consists, in connection with such devices and combinations of the same, of the various novel means, mechanisms, and combinations of parts we employ to give the requisite movements to the several parts of the machine.

Figure 2:
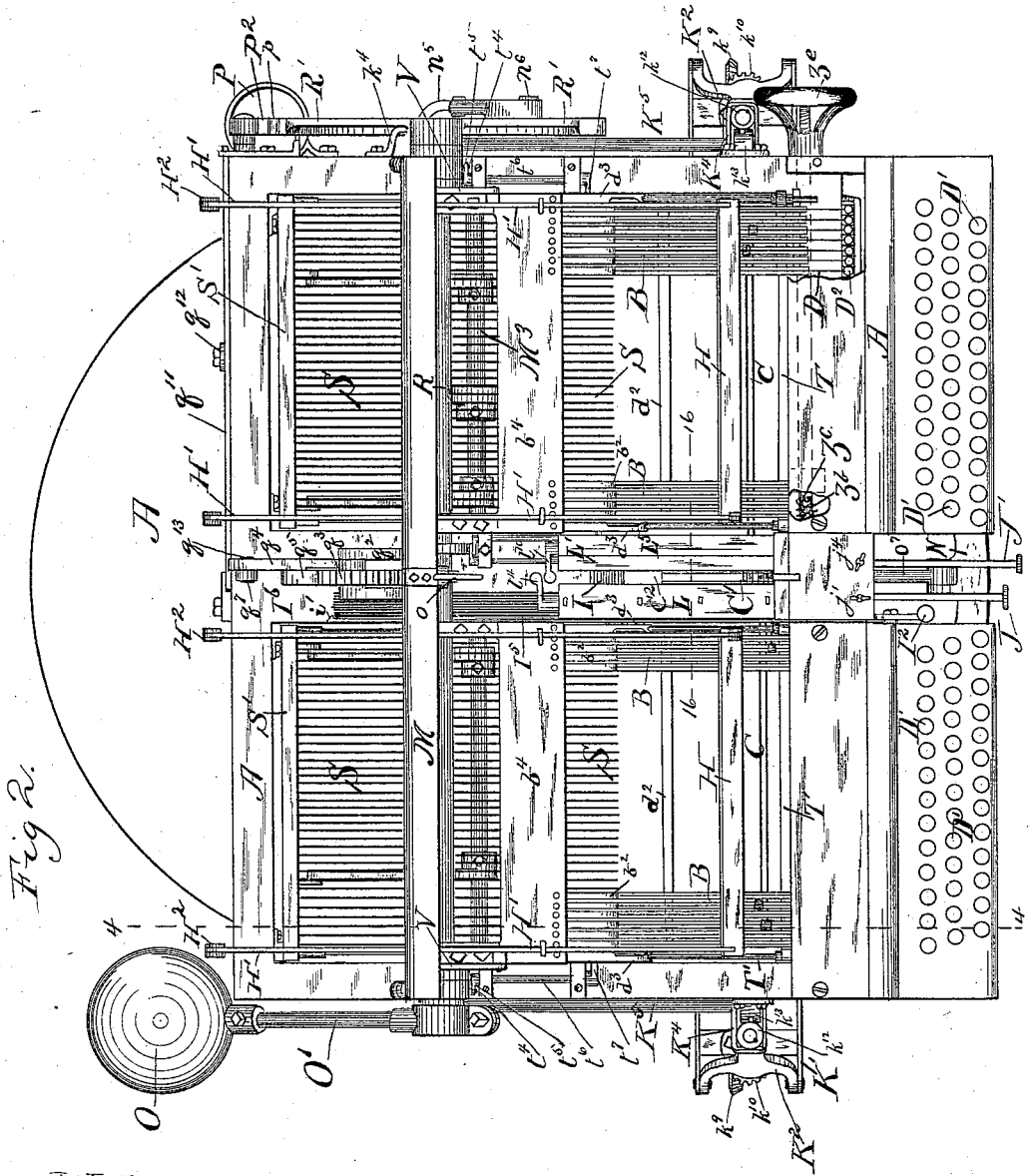
Figure 11:
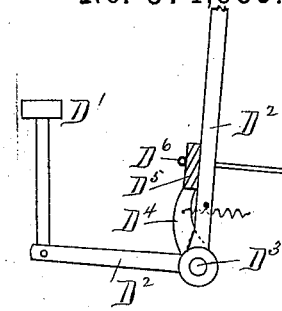
Figure 12:
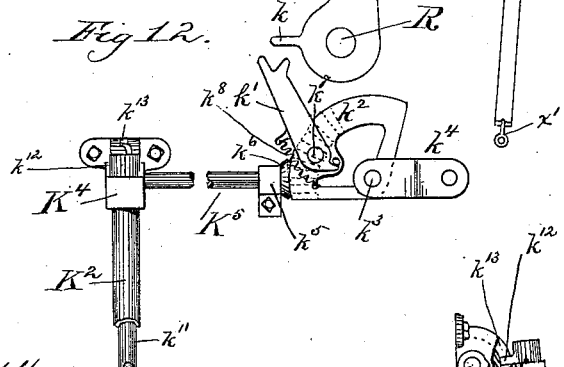
Figure 15:
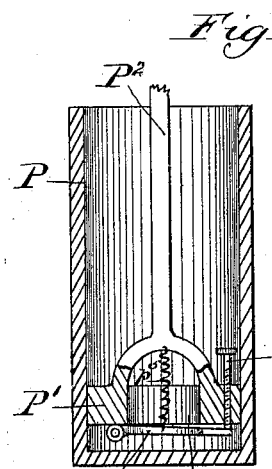
Figure 14:
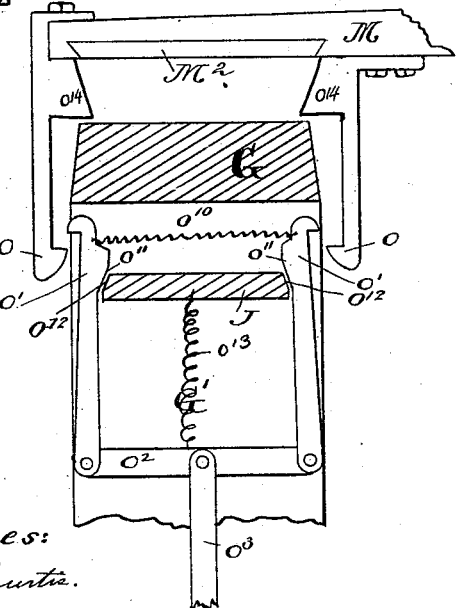
Figure 13:
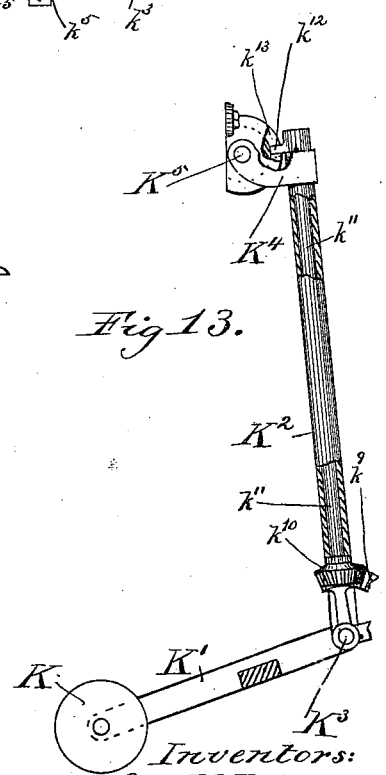

In the accompanying drawings, which form a part of this specification, and in which similar letters of reference indicate like parts, Figure 1 is a front view of a machine embodying our invention. Fig. 2 is a plan view of the same. Fig. 3 is a side view looking at the right side of the machine. Fig. 4 is an enlarged vertical sectional view on line 4 4 of Fig. 2. Figs. 5 and 6 are enlarged detail side and plan views, respectively, of the pushing-bar. Figs. 7 and 8 are enlarged front and side views of the driving mechanism. Fig. 9 is a plan view of the same, and Fig. 10 is a detail side view looking from the left of Fig. 7. Fig. 11 is an enlarged side elevation of one of the keys and its connections. Fig. 12 is an enlarged detail view showing the mechanism for operating the movable rest or roller. Fig. 13 is an enlarged detail front view of the same. Fig. 14 is an enlarged detail side view of the impression-bed, showing the mechanism for producing the impression. Fig. 15 is a sectional view of a mercurial governor device for regulating the backward movement of the impression-bed. Fig. 16 is a sectional view showing the alining-bars and spacing devices. Figs. 17, 18, and 19 are enlarged detail views showing the automatic spacing devices and mechanism for actuating the same. Fig. 20 is an enlarged plan view showing the line as set up and the locking-bars. Figs. 21 and 22 are side and plan views of a pinion and clutch whereby the cam-shaft is operated from the segment on the impression-bed shaft. Fig. 23 is a section of the impression-bed at right angles to its face, showing the screw for moving the impression-plate. Figs. 24, 25, and 26 are respectively plan, rear, and side views of the mechanism for regulating the movement of the impression-plate. Fig. 27 is an enlarged front view illustrating the operation of the movable rest or roller in lowering the type-arms. Fig. 28 is a front view illustrating the operation of the sweepers in raising the type-arms. Fig. 29 is an enlarged sectional view through the eye of one of the type-arms. Fig. 30 is an enlarged detail plan view of the spring-pawl which serves to retain the type-arms in position on their supporting-rods when not in use. Fig. 31 is a detail front view of the curved stop-bar $d^2$ hereinafter described. Fig. 32 is an enlarged end view of the hinged leaves I I' or spacing-device. Fig. 33 is a detail view of the type-support and the connections for operating the same.

In said drawings, A represents the frame or pedestal of the machine.

B are the parallel rods or supports upon which the type-arms C are mounted so as to swing pivotally and slide longitudinally thereon. Each type-arm consists of a thin flat bar having an eye or sleeve $c$ at its pivotal end which fits loosely on the stationary supporting-rod B. Each type-arm is furnished with an offset or bend $c'$ near its end, so that when the type-arm is swung into a horizontal position it will not touch the other parallel supporting-rods B between it and the center of the machine. The type $c^2$ is secured near the outer end of the type-arm, preferably by being soldered or welded on, so that it projects at right angles to the type-arm and stands in a vertical position when the type-arm is raised into a horizontal one.

If the parallel rods B should be arranged in an inclined plane instead of a horizontal one, it will be observed that the offsets or bends $c'$ in the type-arms would not be necessary to enable the several sets of arms to be raised to the same position, but such construction would of course necessitate the types of each set being placed at different angles to the arms, as each set of type-arms would lie in different inclined planes when raised for use, and for this and other obvious reasons we deem a horizontal arrangement of the parallel rods B in connection with the offsets in the type-arms to be the preferable mode of practicing our invention.

The type-arms C for each letter or kind of type are of course all alike and of the same length. It will be observed also that the type-arms of each different set or letter are of different lengths, so that types of any set may be brought up into the same line by swinging any type-arm into a horizontal position, the length of the type-arms varying as the distance of the respective supporting-rods B from the line. The rear ends of the supporting-rods B are furnished with spiral springs $b$, which abut against a movable thimble or sleeve $b'$. The type-arms C, when not in use, are pressed by this spring and sleeve against a spring pawl or catch $b^2$, the outer end of which is furnished with a fork or recess $b^3$, that fits partially over the rod B. The other end of this spring-pawl $b^2$ is secured to a movable plate $b^4$, attached by a flat flexible spring $b^5$ to an arm $b^6$, which is pivoted to the impression-bed shaft R. The rods B are furnished with a guide groove or slot $b^7$, in which the spring hook-bar D reciprocates back and forth when actuated by the key D' through the bell-crank lever $D^2$, pivoted to the frame of the machine by the shaft or rod $D^3$. The reciprocating hook-bar D consists of a thin flat bar fitting in the guide or slot $b^7$ in the stationary supporting-rod B, the free end of which is curved upward, preferably about as shown, so that the hook or catch $d$ will press or project against the inner surface of the eyes or sleeves $c$ of the type-arms. Now the sleeves $c$ of the type-arms are each provided with a notch, recess, or opening $c^3$ in which the hook $d$ will engage. The extreme end of the hook-bar D is provided with a recurve or bend $d'$, so that when the hook-bar D is moved back or to the right, as shown in Fig. 4, it will readily pass under the eyes or sleeves $c$ of the type-arms.

The front type-arm, it will be observed, always abuts against the spring-pawl $b^2$ and is therefore always in precisely the same position. The reciprocating movement given to the hook-bar D by the key is such as to bring the hook $d$ into position to register with the notch or recess $c^3$ of the front type-arm and then to draw such type-arm forward from behind the spring-pawl $b^2$ and into position to be swung pivotally or elevated into a horizontal position for use. As the reciprocating hooks D in rapid operation of the machine of course move somewhat quickly, in order to insure that the type-arms will always be left in position to be caught by the elevating device and also to prevent them from vibrating, we provide a stop $d^2$, consisting of a bar extending beneath the rods B and transversely thereto to limit the forward movement of each type-arm and stop its vibration as it is pulled into position by the hook-bar D. This bar $d^2$ is secured rigidly to the movable bed or support G, upon which the free ends of the type-arms C rest when the same are extended horizontally. The type-arms are next swung into a horizontal position by means of rotary sweeper-arms E, preferably four in number, secured to a shaft E' or a disk on said shaft, which is rotated to the right or left, according as the type-arm to be elevated is on the right or left side of the machine. Each of these sweeper-arms E is furnished at its end with a light spring saddle or bearing $e$ to engage the type-arm. This spring-bearing for the type-arm may preferably be made of about the form shown in the drawings at Figs. 1, 3, and 28.

The purpose of providing the sweeper-arm with a spring-bearing for the type-arm to strike against is to prevent the quick movement of the sweeper-arm from knocking the type-arms violently and to cause them to gently elevate the same. Without some cushioning device, like the spring $e$ or some equivalent therefor, there would be danger of the sweeper-arms knocking the type-arms with such violence when the machine is rapidly operated as to injure or disengage the type from the type-arms, unless indeed the type were made integral with the type-arms, which would be an expensive construction. It will be observed from Fig. 28 that the bearing-point $e'$ of this spring-saddle $e$ projects below the end of the arm E and to one side thereof, so that the short type-arms, as well as the long ones, will be first struck some distance from their eyes or pivots and then finally rest on the end of the sweeper-arm E as the same is turned into a vertical position. But for this construction the short type-arms would necessarily be first struck by the sweepers near their eyes, and consequently offer much greater resistance to the movement of the sweeper-arms and occasion injury.

The stop-bar $d^2$ projects slightly over the sweeper-saddle $e$, so that the type-arm will be caught at the central bearing part $e'$ of the saddle, and said stop-bar is curved to conform to the path described by the sweeper, so that the longer type-arms will strike against the stop near their lower ends. The sweeper-shaft E' is put in operation at the same time and by the same movement of the key that pulls the type-arm into position.

The position of the several sweeper-arms E in relation to each other and to the movement of the sweeper-shaft E' may be adjusted by means of the brace-rods $e^2$ and adjusting-rods $e^3$, which are furnished with threaded ends and adjusting-nuts $e^4$.

The sweeper-arms E, it will be observed from Fig. 3 of the drawings, are dished or inclined, so that the sweeper-saddle $e$ projects to one side of the arms. The purpose of this is to prevent the type-arms or the type thereon from catching against the sweeper-arms as they are elevated, which they might otherwise do, especially if their vibration is not entirely prevented.

As each type-arm is raised into a horizontal position it is moved forward longitudinally on its supporting-rod at one end, and on the movable support G at the other end, into its proper position in the line C' by means of a reciprocating pusher-bar H, which is put in operation by the same movement of the key and is actuated automatically from the source of power by means of the connecting-rods H', levers $H^2$, and connecting-rods $H^3$ from the actuating mechanism. The type $c^2$ project upward and move along a path or way $C^2$, extending parallel to the rods B and in the center of the machine. The pushing-bars H are provided at suitable intervals with a number of pivoted fingers $h$, adapted to ride over the type-arms when the pusher-bar H reciprocates backward and to catch the type-arms and push them forward when the pusher-bar makes its forward reciprocation. These pivoted fingers $h$ are made thin and project between the parallel supporting-rods B. Curved bars $d^3$, secured to the same plate $b^4$ which carries the spring-pawls $b^2$, project forward of said spring-pawls and over the eye of the type-arm when pulled forward by the hook-bar D, so that the heel of the pusher-bar H, which is slightly elevated, will ride at each end on the cam-surface $d^4$ at the end of this curved bar $d^3$ over the eye of the type-arm to prevent the type-arm from being carried backward by the pusher-bar. After passing over the cam-surface $d^4$ of these curved arms $d^3$ the pusher-bar again drops down upon the rods B into position to shove the type-arm forward. The movable support G is made long enough to carry the free end of the type from the sweeper E to the farther end of the line and to support the type in the line while the impression is being taken therefrom. This support G is mounted on the end of an arm G', which is secured to the rock-shaft $G^2$ on the frame of the machine. This arm G' is swung in and out by means of a lever or crank-arm $G^3$ on the rock-shaft G, actuated by the rod $G^4$ from the cam $g$ on the main cam-shaft. When a word in the line has been completed, a spacing device consisting of two leaves or plates I I', hinged together on a horizontal pivot $i$, is brought into position in the line by depressing an appropriate key $I^2$, which, through the bell-crank lever $I^3$, actuates the reciprocating bar $I^4$, provided with a hook $i'$, adapted to engage and pull forward into position in front of the next type-arm, when elevated, one of the plates $I^5$ upon which the pivot of the hinged leaves I I' is mounted.

The flat bars or plates $I^5$, that carry the spacing devices I I' I I', are supported by a table $I^6$, located at the rear part of the machine, that is to say, back of the sweeper-arms, so as not to interfere with their movement, and they rest between vertical guides or walls $I^7$ $I^8$, which also serve as guides or supports for the reciprocating hook-bar $I^4$, the end of which is pressed against the plates $I^5$ by means of a spring $i^2$, so as to catch against the end of one of said plates $I^5$, as illustrated in Fig. 17. The reciprocating hook-bar $I^4$ serves to pull the plate $I^5$ and spacing device thereon only part way, the spacing device being shoved into its proper position in the line by the next type-arm behind it, when the same is pushed forward by the pushing-bar H, as before described. The upper and lower edges of the hinged leaves I I' are cut beveling, as shown at $i^3$, so that even when the hinged leaves stand extended vertically the pressure exerted upon the ends of the leaves will not come on a line with their pivot, and therefore will tend to close the leaves and make them operate as a knee-joint lever to press apart the two adjacent words in the line. By making the hinged leaves I I' beveled in this way at their ends we are enabled to make them thinner and to occupy less space, and it is unnecessary to arrange their pivot outside of the line of the leaves when extended straight, which arrangement would of course cause them to take up more room. The hinge $i$ is placed at the outer edge of the leaves, so that it does not extend between the type. Each plate $I^5$ to which the leaves I I' are pivoted is provided with stops or projections $i^4$ $i^5$ to prevent the leaves closing in the wrong direction.

When the line has been completed and a spacing device inserted between each two contiguous words, a stop or locking-bar J is brought into position at the end of the line to determine its proper length, according to the width of the column or page in which the line is to form a part. This locking-bar J is mounted in a suitable groove or guide in the stationary bar L at the side of the line, and it is provided with a projection $j$ at its end, against which the end of the line abuts. The locking-bar J is adjustable and may be set at any desired point, according to the length of the line to be formed, by the set-screw $j$. The other locking-bar J' reciprocates in a suitable guide or groove $l$ in the movable straightening-bar L' on the other side of the line, and it is provided with a pivoted arm or projection $j^2$ near its end, which is adapted to shut down within the bar J' like the blade of a jack-knife when the bar J' is moved to the extreme of its throw, so that the end enters the pocket $l'$ in the bar L'. By this means the arm $j^2$ is out of the way of the type and spacing devices when the same are moved forward one by one along the groove or way $C^2$ between the bars L and L'. When the locking-bar J' is pulled forward until the arm $j^2$ passes the inner side or wall $l^2$ of the pocket $l'$, a spring $j^3$ opens the pivoted arm $j^2$, so that it projects at right angles across the way or space $C^2$ and thus engages the types therein. A set-screw $j^4$ serves to fix the locking-bar J' in its proper position according to the length of the line. Pressure is next exerted upon the spacing devices I I' between the several words in the line, as the lower edges of the spacing-leaves I I' rest upon the rigid plate L³, secured to the frame of the machine by means of a plate or bar L⁴, one edge of which rests upon the leaves I I', and which plate is pivoted at $l^3$ to the straightening-bar L.

The pivoted plate or bar L⁴ is provided with a crank or projecting arm $l^4$, Fig. 2, against which a spring tappet or arm $m$, which is or may be a simple tubular block of rubber, on the impression-bed M impinges as said bed descends to take the impression. The spring-tappet $m$ is so located on the impression-bed in relation to the operating-arm $l^4$ that the requisite pressure is exerted upon the spacing devices I I' to separate the words and force the type of each word snugly together before the matrix touches the face of the type. The spring tappet or arm $m$ will of course yield more, so as to permit the impression-bed to descend sufficiently farther to take the impression.

The movable straightening-bar L' has an inclined rear face $l^5$, which fits upon a similar incline $l^6$ on the front edge of the stationary bar or plate L⁵, in which the bar L' is mounted and against which it abuts. Now the bar L' has two movements, a side movement, by which it is pressed forcibly against the edges of the type to straighten the line and hold the type rigid and firm, and, second, a vertical movement, by which all the type-arms in the line are pressed down flat upon the supporting-bed G. It will be observed from Fig. 16 that the ends of the type-arms on the left side of the machine extend slightly beyond the type, so that the bar L' may bear upon such projecting ends and thus level the faces of all the type in the line. In practice we make all the type-arms with these projecting ends $c^4$, because it is more convenient to make them all alike, but it is obvious that the projecting ends $c^4$ need to be upon the type-arms of only one side of the machine. If the bar L' on the other side of the machine should be given a slight vertical movement to level the type-arms on that side, it is obvious that these projecting heels $c^4$ might be left off of all the type-arms, but that before described we regard as the better and simpler way of practicing our invention. The bar L' is moved downward and sidewise at the same time by means of the inclined plane $l^6$ and a rotary shaft or cam $l^7$, which is mounted in the stationary bar L⁵ and engages with a projection $l^8$ on the bar L'. This projection may preferably consist of a steel plate L⁸, made separate from the bar L' and secured in a suitable groove therein. The shaft $l^7$ is provided with a curved recess or cam-surface $l^9$, that engages this projecting plate $l^8$ and operates, when the shaft $l^7$ is turned, to force the bar L' both downward and sidewise. The shaft $l^7$ is provided with a crank-arm $l^{10}$, against which a spring-tappet $m'$ on the impression-bed impinges, and thus operates the straightening-bar L'. The spring-tappet $m'$ is similar in construction and operation to the tappet $m$, before described. One or both of the straightening-bars L L' are furnished on their upper face with a graduated scale L², as shown in Fig. 20, by means of which the length of the line can be determined. The divisions of the scale should of course be those generally employed by printers, that is to say, "picas" or "nonpareils."

The impression-bed M is mounted pivotally on a shaft R, so that it may be swung up into a vertical position, as shown in Fig. 3, out of the way after the impression has been taken.

M² is the matrix-plate, to which any suitable matrix of wax or wood or other suitable material may be secured, and this plate is mounted in suitable guides $m^2$ on the impression-bed and is provided with a leading-screw $q$, by means of which the matrix-plate may be moved the distance of one line as each impression is taken.

The impression-bed is swung down into a horizontal position by means of the foot treadle or lever N, pivoted at $n$ to the frame of the machine and provided at the other end with a toothed segment $n'$, which engages with a gear $n^2$ on the shaft $n^3$ that carries the wheel $n^4$, to which the pitman-rod $n^5$ is connected, said rod being connected at its other end with the segment or crank-arm R', secured rigidly to the shaft R. This pitman-rod is connected to the segment R' by a pin $n^6$, which passes through a slot $n^7$ in the pitman-rod, so that after the impression-bed is brought down into a horizontal position very near the type this slot will permit the impression-bed to be still further depressed by more powerful mechanism for the purpose of taking the impression as the wrist-pin $n^8$ on the wheel $n^4$ passes the center. The impression-bed is provided with a pair of rigid grappling-hooks $o$, which engage corresponding grappling-hooks $o'$ when the impression-bed has been brought near the face of the type by the mechanism above described. The grappling-hooks $o'$ are pivoted to a cross-bar $o^2$, which is connected by the rod $o^3$ with the toggle-levers $o^4\ o^5\ o^6$, the levers $o^4\ o^6$ being pivoted to the standard G' near its lower end and the link $o^5$ being pivoted at its ends to said levers $o^4\ o^6$. These toggle-levers are operated from the treadle N by means of the connecting-rod $o^7$, pivoted at one end to said treadle-lever and at the other by a slot $o^8$ to the pin $o^9$, which unites the extremities of the toggle-levers $o^5$ and $o^6$. By this means a very powerful pressure may be exerted upon the impression-bed during the last quarter-inch of its movement while the impression is being taken, while at the same time the impression-bed may be quickly swung down from a vertical position to a horizontal one. The grappling-hooks $o'$ are connected together by a spring $o^{10}$ near their top, so as to cause them to automatically release the hooks $o$ when said hooks are raised to a certain point by the spring $o^{13}$, as shown in Fig. 14; and these grappling-hooks $o'$ are also provided with cam projections $o^{11}$ near their upper ends, which engage with stationary cams or projections $o^{12}$ on the standard $G'$ and force the grappling-hooks $o'$ apart, so as to cause them to engage the hooks $o$ as the hooks $o'$ are pulled down by the toggle-levers. The upper portions of the cam-surfaces $o^{11}$ on the hooks $o'$, it will be observed, are parallel, so that after the hooks are properly engaged with each other the further downward movement of the hooks $o'$ will not be obstructed by the stationary cam-surfaces $o^{12}$. Impressions of uniform depth are secured by the stops $o^{14}$, impinging against the bar G.

The impression-bed is elevated automatically by means of the counterpoise-weight O, secured adjustably on the arm $O'$, which is connected rigidly to the shaft R of the impression-bed. As it is desirable that this weight be heavy enough not only to elevate the impression-bed quickly, but also to operate the cam-shaft, and as the acting distance or counterbalancing effect of the impression-bed rapidly diminishes to zero as it nears the vertical, and as the cam-shaft does not offer a correspondingly gradually-increasing resistance, we provide a governor device connected with the impression-bed shaft to regulate its movement and prevent any shocks or jars to the machine as the impression-bed reaches its vertical position. This governor device consists of a vessel or chamber P, containing mercury or other suitable liquid and provided with a piston $P'$, and the rod $P^2$, which is furnished with teeth $p$ on one side that engage with the teeth $p'$ of the segment $R'$ on the impression-bed shaft. As the impression-bed is elevated this piston is thus forced down, and it is provided with a hole or valve-opening $p^2$ and a hinged valve $p^3$. A set-screw $p^4$ limits the extent to which this valve may be closed, and a spring $p^5$ serves to prevent the valve from dropping entirely open. Now as the piston is raised during the descent of the impression-bed the valve will open, so as to permit the free flow of the mercury through the valve, and as the piston descends the hinged valve will be nearly closed, so as to allow the mercury to be slowly forced through the opening, the flow of the mercury being about the same whether greater or less force is exerted on the piston.

The leading-screw $q$, by means of which the matrix-plate $M^2$ is moved in its guides as the impression of each line is taken, is actuated by means of a geared threaded nut $q'$, which turns on the leading-screw and is held stationary by the projecting arms or ribs $q^2$, extending transversely across the impression-bed, and which meshes with the gear-wheel $q^3$, mounted on a shaft on the bracket $q^2$, projecting from the impression-bed. This wheel $q^3$ is turned by means of a lever $q^4$, provided with a pawl $q^5$, engaging with the teeth of said wheel, and which lever is provided at its end with a slot $q^6$, through which it is pivoted to a rod $q^7$, pivoted at its other end in a slot $q^8$ in the arm $q^9$, pivoted loosely on the impression-bed shaft R. To the lower end of the rod $q^7$ is pivoted an arm $q^{10}$, the free end of which rests upon the frame of the machine and abuts against a movable stop or projection, preferably consisting of a lever $q^{11}$, pivoted at $q^{12}$, Figs. 24, 25, and 26, to the frame of the machine. The purpose of the slots $q^6$ and $q^8$ is to adjust the pivots $q^{13}$ and $q^{14}$ on the levers $q^4$ and $q^9$, and thus regulate the stroke to the distance between the lines. The upward movement of the impression-bed in this way serves to turn the leading-screw. After the leading-screw has thus been moved the proper distance for one line by the upward movement of the pawl-lever $q^4$ said lever is returned to its former position by means of a spring $q^{15}$ as the impression-bed is swung downward to take the next impression.

The matrix-plate is actuated by the movement of the screw $q$ by means of a projection $q^{17}$ thereon, which projects through a slot $q^{18}$ in the impression-bed M and impinges against the matrix-plate $M^2$. The screw $q$ is prevented from revolving by a pin or guide $q^{19}$ on one of the ribs or projections $q^2$, which fits in a longitudinal slot $q^{20}$ in the screw. By this means and arrangement of a fixed threaded nut at the middle of the impression-bed or opposite the line, in connection with the leading-screw, thus operating the impression-plate, we are enabled to use a screw of any desired length and to employ a matrix of any length desired, not, of course, exceeding the length of the screw.

After the impressions have all been taken to complete the column or page the leading-screw is returned to its former position by revolving the gear $q^3$ in the opposite direction, said gear being provided with a crank for the purpose.

After a line has been set up if it is found on proving it that an error has been made, it is desirable to distribute the line without taking an impression therefrom and then set it up again; but as the cam-shaft and the distributing mechanism are operated by the movement of the impression-bed it is necessary for this purpose to provide means whereby the impression-bed may be swung down near the line and back without producing in such case any movement of the matrix-plate or its leading-screw. To accomplish this result, we make the stop $q^{11}$, against which the arm $q^{10}$ strikes, movable, so that in case the impression-bed is swung down without taking an impression, this stop being removed or not moved into position, no movement will consequently be imparted to the leading-screw. This stop is automatically moved up into position each time an impression is taken by means of a projection $q^{22}$ on the segment $R'$ striking against a lever $q^{23}$, pivoted to the frame of the machine, and which engages and operates the stop-lever $q^{11}$. The projection $q^{22}$ is so located on the segment $R'$ that it operates said stop by the last quarter-inch movement of the impression-bed which produces the impression. In case this last quarter-inch movement is not given to the impression-bed the stop $q^{11}$ is of course not moved into position. When the impression-bed swings up, another similar stop $q^{24}$ on the segment R', engaging said lever $q^{23}$, moves the stop-lever $q^{11}$ out of position. This stop $q^{21}$ is so located on the segment as to move the stop-lever near the end of the upward movement of the impression-bed. As the impression-bed M descends to take the impression it not only automatically operates the spacing-device bar L$^4$ and type-leveling and line-straightening bar L', as before described, but it also causes the rest or roller K to swing up under the type-arms into position to receive and gradually lower them, when the type bed or support G is removed after the impression has been taken. This is done by means of a projection or arm $k$ on the impression-bed arm or frame M' engaging with the operating-lever $k'$, that actuates the segment-gear $k^2$, which is pivoted at $k^3$ to the bracket $k^4$ on the frame of the machine.

For bringing the type-arms from a horizontal to a vertical position after being used to set up a line of type we prefer to employ a movable rest in the form of a roller K of sufficient diameter to prevent the type crossing as they are lowered. This roller is supported at its ends by the side pieces K', preferably on pivots, so as to decrease the friction on the type-arms. These side pieces are joined to the arm or wing K$^2$ by the pin K$^3$, which at its upper end is secured rigidly to the arm K$^4$ of the rock-shaft K$^5$. This rock-shaft K$^5$ is journaled on the brackets $k^5$ on the frame of the machine and is partially revolved by means of beveled gear $k^6$ thereon engaging with the teeth of the segment-gear $k^2$, so as to swing the arm or wing from about a vertical into nearly a horizontal position. The segment $k^2$ is operated by a pin or projection $k$ on the arm M' of the impression-bed striking against the forked lever $k'$ in moving the impression-bed forward and downward to take the impression, said forked lever being pivoted to the segment $k^2$ by the bolt $k^7$ and kept in proper position for the reception of the pin $k$ on the arm of the impression-bed by a spring $k^8$.

As it is desirable that the arm K$^2$ shall remain stationary after having raised the roller up under the type-arms in the line while the impression-bed moves downward to produce the impression and again upward for a short distance, the segment $k^2$ is supplied with teeth for a distance only sufficient to bring the roller into the desired position under the type-arms, the rest of it being smooth or "mutilated," so as to allow the last tooth of the segment to slide on it. The joint connection between the frame K', supporting the roller and the arm or wing K$^2$, serves the purpose of allowing the roller to move in any line deviating from a circle. We prefer to make it move in a straight line at an angle of forty-five degrees from the vertical. The movement of the roller-frame with reference to the arm or wing $k^2$ is produced by the beveled segments $k^9$ and $k^{10}$. The segment $k^9$ must of course be placed concentric with the joint or pivot K$^3$, and the segment or bevel-gear $k^{10}$ is secured to a shaft $k^{11}$, running in proper bearings through the tubular arm or wing K$^2$. Rotary movement is imparted to this shaft by a crank-pin $k^{12}$ and stationary cam $k^{13}$ as the arm $k^{12}$ is swung from a vertical to a horizontal position and back again into a vertical position.

The cam-shaft M$^3$ is operated from the impression-bed shaft R by means of a segment-gear R', which intermeshes with a spur-gear R$^2$ on the cam-shaft. This gear R$^2$ fits loosely on its shaft, and the shaft is furnished with a clutch consisting of the spring-pawl $r$, pivoted on the disk $r'$ and which engages with a suitable clutch-surface on the gear R$^2$, said clutch operating to cause the gear R$^2$ to turn the cam-shaft on the upward movement of the segment R' and the impression-bed and to allow said cam-shaft to remain stationary during the downward movement of the impression-bed.

After the impression of the line has been taken the impression-bed M moves upward, thus turning the cam-shaft. When the impression-bed first begins its upward movement, the movable rest or roller K remains or is held stationary for a moment on account of the mutilated segment $k^2$, and during this interval the cam $g$ on the cam-shaft swings the movable bed or support G, upon which the type-arms rest, forward, thus allowing them to rest upon the roller K, one of which is of course on each side of the machine. As the impression-bed continues its upward movement the rests or rollers K are gradually lowered on lines inclined about forty-five degrees to the vertical until all the type-arms are left hanging in vertical position from their respective supporting-rods.

A series of fingers S, corresponding in number to the different sets of type-arms and which are pivoted to the transverse bars S', one on each side of the machine, are next moved forward horizontally under the parallel supporting-rods B, so as to separate the different sets of type-arms that have been lowered by the rollers K to stop their vibrations and prevent them from being entangled as they are moved back into their original positions at the rear end of their respective supporting-rods. The forward or free ends of these fingers S all rest upon supporting-bars S$^2$, one for each side of the machine, and the finger-bar S' is thrust forward at the proper moment by a spring $s$ acting upon levers $s'$, the lower ends of which are pivoted at $s^2$ to the frame of the machine and the upper ends of which are pivoted by a pin $s^3$ to a link $s^4$, that is pivoted at its other end to the finger-bar S'. The link $s^4$ serves to permit the bar S', thus actuated, to move forward freely in its horizontal guides or supports. A cam $s^5$ on the cam-shaft $M^3$ prevents the spring $s$ from moving the finger-bar $S'$ forward until the proper moment, that is to say, until the type-arms have been lowered into a vertical position. This cam $s^5$ also serves to move the finger-bar $S'$ back to its original position.

It should be observed that in the drawings we have not endeavored to show the proper shape or outline of the cams. The finger-supporting bars $S^2$ are hinged or pivoted at their inner ends next the shorter type-arms to the frame of the machine by the pins $s^6$, so that these bars $S^2$ may be dropped down into an inclined position in order that the fingers $S$, resting near the outer ends of the bars $S^2$, may stand in an inclined position and thus fall near the extremities of the longer type-arms, as indicated in dotted lines in Fig. 4. By placing the fingers in this way near the loose ends of the pendent type-arms they will better prevent any liability to vibration or entanglement of the type-arms. This movement of the finger-supporting bars $S^2$ on their pivots is effected by means of a cam $s^7$ on the cam-shaft and a connecting-rod $s^8$, the upper end of which is pivoted to the bar $S^2$, the cam being so timed that this movement takes place immediately after the fingers $S$ are thrust forward. The type-arms are next pulled back on their supporting-rods $B$ by means of reciprocating bars $T$, which extend transversely immediately under the rods $B$, so as to engage the pendent type-arms near their eyes. The bars $T$ are supported at each end on stationary rods or guides $T'$, extending parallel to the supporting-rods $B$ and at each side of the same and preferably lying in the same plane, the ends or eyes $t$ of the bars $T$ projecting slightly upward, so that the bars $T$ may lie under the rods $B$. The type-arm-pulling bar $T$ is given its backward reciprocation by means of the sliding hooks $T^2$, which are rigidly secured to the reciprocating finger-bar $S'$ and actuated by its return movement. These hooks $T^2$ are four in number, two for each bar $T$, and they are caused to engage the bars $T$ by means of an inclined end $t'$ on the end of the hook, the hook-bars $T^2$ having sufficient elasticity to permit the hooks $t^3$ to snap under the bar $T$. The hook-bars $T^2$ are disengaged from the bars $T$ at the proper time after they have pulled the type-arms back by means of a pin $t^4$ on the impression-bed shaft $R$ striking against an arm $t^5$ on a rock-shaft $t^6$, mounted in suitable bearings on the frame of the machine, which rock-shaft is provided with another arm $t^7$, that strikes the hook-bar $T^2$ and depresses it just at the moment the impression-bed comes to rest. As the type-arms are pulled back by the bar $T$, actuated in the manner described by the upward movement of the impression-bed through the cam-shaft, a projection $v$ on the arm or frame $M'$ of the impression-bed strikes against an arm $V$, provided with hook projections $v'$ on its end, rigidly secured to the bar $b^4$, which carries the spring-pawls $b^2$, and thus elevate the spring-pawls slightly, so that the eyes of the type-arms can pass under them. This upward movement of the spring-pawls takes place just as the type-arms approach them, and after the type-arms are pulled back into their original position by the bar $T$ and while they are there held by said bar the further movement of the impression-bed releases the arm $V$ from the projection $v$ by causing the inclined end of the hook $v'$ to strike against a stationary cam $v^2$ on the frame of the machine, thus allowing the spring-pawls $b^2$ to spring back into position to retain the type-arms in place. When this is done, the hooks $T^2$ release the pulling-bar $T$, and then the coil-springs $T^3$ on the rods $T'$ return said bars to their former position. To prevent the hook on rod $D$ from projecting above the rod $B$ when the type-arms and sleeve $b'$ are pushed forward by the spring $b$ as the pawl $b^2$ is raised to allow the type-arms to be pushed behind it, we insert into the rod $B$ an inclined plate $b^3$, against which the bent end of the hook-rod $D$ presses and thus prevents the hook from interfering with the free movement of the type-arms into their original position behind the spring-pawls. The bar $b^4$, to which the stationary type-arm-supporting rods $B$ are secured rigidly, is provided with arms $b^6$, which are pivoted to the impression-bed shaft $R$, so that all the rods $B$ may be turned up for convenience in changing the type-arms and type, oiling and repairing the machine, &c.

The separate hook-bars $D$ are operated directly from their appropriate keys, as before stated; but the sweeper-arms $E$ and the pusher-bar $H$, which of course move, whatever key is depressed, are operated by power which is simply set in motion by the depression of the key. On the shaft $D^3$, to which the bell-crank levers $D^2$ are pivoted, arms $D^4$ are also pivoted, which are provided with a bar $D^5$, extending transversely just in front of the vertical arms of said levers $D^2$, so that whatever key is depressed this rocking frame or bar $D^5$ will be timed or moved. The bar $D^5$ is connected by a rod $D^6$ with a forked lever $x$, pivoted near its middle to the frame of the machine, and which operates a catch or pawl that releases the power or weight, so that it will, through appropriate connecting mechanism, operate the sweeper-shaft $E'$ and the pusher-bar $H$ every time a key is depressed.

As the sweeper-shaft turns in opposite directions when keys on opposite sides of the machine are depressed, we employ a separate rocker-bar $D^5$ for each side of the machine and separate rods $D^6$, the rods $D^6$ on the other side connecting with a similar forked lever $y$, which operates a similar catch $y'$, that releases either the same or a different power or weight arranged to turn the sweeper-shaft in the opposite direction. We prefer, however, to employ but a single weight and arrange the connecting mechanism so that it will operate the sweeper-shaft in opposite directions, according as the catch or pawl $x'$ or $y'$ is released by depressing a key on the one or the other side of the machine.

The shaft E', carrying the sweepers E, is revolved by the weight 2, suspended from the endless chain 3, which passes over the pin-gears 4 and 5 in opposite directions, said weight tending to revolve the gears 6 and 7 in opposite directions. The gears 6 and 7 engage with the pinions 8 and 9, respectively, which are secured to the star-wheels 10 and 11, respectively, said star-wheels being prevented from revolving by one of the pins 12 of each wheel striking or pressing against the stop 13, secured to the frame 14. The gears 6 and 7 and 10 and 11 run loose on their respective shafts, being held in position by suitable sleeves. The disk or wheel 15 is permanently secured to the sweeper-shaft E' by means of a pin. This disk has a number of holes, whose size and position correspond exactly to the pins 12 of each wheel 10 and 11.

By depressing any of the keys D' the bell-crank $D^2$ strikes against the rocking frame $D^5$, imparting to it a slight movement. This rocking frame is by the wires or rod $D^6$ connected with one end of the lever $x$ or $y$, the other end, which is forked, connecting with the pawls $x'$ or $y'$ on the rocking shaft 20, which also has the short levers or pawls 21 and 22. The lever 21 serves to push the pin 23 against the pin 12, so as to make it enter the hole just opposite to it in the disk 15 and at the same time pass by the stop 13, thus allowing the wheel 10 or 11 to revolve, carrying the disk 15 with it, and consequently revolving the shaft E'. It will thus be understood that by depressing any of the keys D' the shaft E' may be made to revolve in opposite directions, according as a key on one or the other side of the center of the machine is depressed, the direction in either case being the one required to operate the sweepers so as to elevate the type-arm thrown forward by the key depressed.

As we have chosen to employ four sweepers, the shaft E' must of course make a quarter of a revolution for elevating each type-arm. Consequently the wheels 10 and 11 must each have four pins 12 and the disk 15 four holes to receive either of said pins. The pins 12 have each a spring $12^a$, which tends to keep each pin in such a position as to strike against the stop 13, when the wheel 10 or 11 revolves, and consequently stop its motion, thus preventing the wheel from revolving more than a quarter of a revolution. When a pin 12 is pushed into a hole in the disk 15 and made to pass the stop 13, the pin is prevented from being pushed back again by its spring $12^a$ before the wheel 10 or 11 (and consequently the disk 15 and shaft E') has made a quarter of a revolution by sliding along a parallel guard-plate 24, which extends in a curved line from the stop 13 for nearly a quarter of the circumference of the wheel 10 or 11, the pin leaving said guard-plate, thus allowing its spring to withdraw it from the hole in the disk 15, as soon as, or a little sooner than, the next pin strikes the stop 13.

In order to always keep the disk 15 in the proper position for the pin 12 to enter one of the holes $15^a$, and also to stop the further revolution of the shaft E' from the momentum of the sweepers when the pin 12 is withdrawn from the hole in the disk 15, said disk has four notches $15^b$, into two of which the pawls 25 are depressed by suitable springs. Each of the pawls 25 is secured to one end of a rocking shaft 26, one of which is shown in Figs. 7 and 8 and also by dotted lines in Fig. 9. To the other end of said rocking shaft is secured a lever or pawl 27, Figs. 7 and 9, between which and the lever 22 on the rocking shaft 20 connection is obtained through a movable pin or tappet 28, passing through the frame 14, as shown in Figs. 7 and 8. As the lever 22 is secured to the same rocking shaft as the lever 21, it will be understood that the pawl 25 is raised from the notch $15^b$ in the disk 15 simultaneously with the pushing of the pin 12 into its corresponding hole in disk 15, which thus is allowed to revolve a quarter of a revolution, when it is stopped by the pawl 25 entering the next notch in the disk. The pin 23 is held against the lever or pawl 21 by a coiled spring $23^a$, as shown in Fig. 8.

Besides revolving the shaft E', the weight 2 also serves to actuate the reciprocating pushing-bar H by the mechanism presently to be described. On each wheel 10 and 11 are four pins 30, Figs. 8, 9, and 10. As said wheels always move in the direction indicated by the arrows in Fig. 9, the pins on the wheel 10 depress the lever 31, and the pins on the wheel 11 raise the lever 32, at each partial revolution. The lever 31 is secured to one end of the rocking shaft 33, to the other end of which the lever 34 is secured. The free end of this lever 34 is pivotally connected with the vibrating arm $H^2$ by the rod $H^3$. The lever 32 is secured to one end of the other rocking shaft 33, to the other end of which the other lever 34 is secured. The free end of this lever is pivotally connected with the vibrating arm $H^2$ by the rod $H^3$ on the other side of the machine.

The vibrating arms $H^2$ on each side of the machine, Fig. 4, are at their lower ends secured to the shaft $H^{10}$, thus forming a rigid frame, and carry at their upper ends, by pivotal connection, the rods H' H', which connect the pushing-bar H with said vibrating arms. The pushing-bar for the other side of the machine is connected with the vibrating arm on that side in a similar manner. When a pin 30 on the wheel 10 strikes and depresses the lever 31, the pushing-bar H on the one side of the machine is, through the mechanism just described, drawn back. At the instant the pin 12 strikes against the stop 13 the lever 31 passes by the pin 30, and the pushing-bar H is moved forward by the spring H⁴, attached to the vibrating arm H². Similarly, when the lever 32 is raised by a pin 30 of the wheel 11, the pushing-bar on the other side of the machine is drawn back, and again moved forward by the spring H⁴ as soon as the pin 30 has passed by said lever.

As it is of great importance that the pushing-bars H act at the proper time, that is to say, at the very instant the type-arm has reached a horizontal position, and the sweeper has come to a stop, the levers 31 and 32 must be of proper length with reference to the pins 30, so as to leave the pin at the proper moment, that is to say, at the very instant the wheels 10 or 11 are stopped by the pin 12 striking against the stop 13.

In order to raise the weight, the pin-gear 5 is, through a ratchet-wheel $5^a$ and pawl $5^b$, connected with the wheel 7. One loop of the chain 3 passes under a sheave in said weight, and the other loop through a pulley $2^a$, which passes through a slot in the weight at one side of said sheave. A shield (not shown in the drawings) prevents the pulley and that part of the chain passing through the slot from interfering with the free movement of said sheave, the slot or opening in the weight being thereby divided longitudinally into two slots, one for the sheave and the other for the chain and pulley. To the hook in the pulley $2^a$ is attached one end of a chain $3^b$, which passes under a sheave at the base of the column A, (not shown in the drawings,) the other end of which is fastened to the shaft $3^c$, which is revolved by a handle $3^d$ on the wheel $3^e$. The winding may most conveniently be done immediately after taking the impression of each line.

The eyes $c$ of the type-arms are made slightly larger than the supporting-rods B, and the inner face of these eyes or sleeves $c$ is curved or beveled, as shown at $c^5$ in Fig. 29, so that the upper ends of the type-arms may be drawn forward by the hook-bars D without binding on their supporting-rods, even though the lower ends of the type-arms may remain stationary or nearly so. This construction of the eyes $c$ also prevents their binding on the rods B if the type-arms happen to swing or vibrate.

Certain features of the machine herein shown and described are, as we believe, the sole invention of said Ole M. Peterson, and constitute the subject-matter of his companion application, filed of even date herewith; and we hereby disclaim as our joint invention the subject-matter claimed in said sole application of said Peterson.

We have herein shown and described what we deem to be the best way or means of practicing our invention and have shown and described what we consider the best form and construction of each of the several operative parts or devices of the machine, as well as of the mechanism for operating the same or giving them their required movements, and while certain features of our invention consist in the particular form and construction of such operative parts or devices and of the operating mechanism therefor, we desire it to be distinctly understood that the broader features of our invention, consisting in the various novel combinations of these operative parts or devices, are independent of the particular form, construction, or kind of operative parts or devices employed, and in its broader aspect our invention is not limited to any particular construction of the device for retaining the type-arms at one end of their supporting-rods, or of the device for pulling them forward one by one, or of the device for elevating them into position for use, or of the device for pushing them forward into position in the line, or of the other devices or operative parts of the machine, or of the particular mechanism employed for giving such operative devices their requisite movements. Various equivalent or substitute devices which may suggest themselves to the skilled mechanic may be used in the place of those herein described without departing from the principle of our invention.

The companion sole application of said Peterson hereinabove referred to is Serial No. 196,061, and reference is hereby expressly made thereto for the purpose of distinguishing more definitely and certainly between the subject-matter herein claimed as our joint invention and the subject-matter therein claimed as the sole invention of said Peterson. For example, the stationary supporting-rods B, with the longitudinally-movable and pivotal or swinging type-arms C, mounted thereon, is, broadly, the sole invention of said Peterson, while the combination of these devices, with the mechanism substantially as described herein for sliding said type-arms on said rods and means substantially as described for swinging said type-arms pivotally, is our joint invention, as will be more clearly understood by reference to claim 3 of this application and to claim 1 of said sole application, Serial No. 196,061. So, too, certain peculiarities of construction of the type-arms C, as set forth in claims 1 and 2 herein, are our joint invention, while other peculiarities of construction of the type-arms, viz., their bends or offsets $c^2$ to adapt them to coact with the parallel supporting-rods B, are the sole invention of said Peterson. Generally speaking, the subject-matter claimed in said sole application covers the broad primary or generic forms or combinations of certain of the devices, while the claims or subject-matter of said joint application, in so far as they cover the same devices or combinations of devices, embrace improved forms or constructions of said devices or improved and more limited combinations thereof, as will be readily understood by those skilled in the art by comparison of the claims.

We claim—

1. The type-arm C, consisting of a thin flat bar, twisted at right angles near its end and provided with an eye $c$ at one end and type $c^2$ at the other, substantially as specified.

2. The type-arm C, having eye or sleeve $c$ provided with notch or recess $c^3$, substantially as specified.

3. The combination of parallel supporting-rods B, with pendent type-arms C mounted loosely thereon, means substantially as described for sliding said type-arms, and means substantially as described for swinging them pivotally, substantially as specified.

4. The combination of a series of type-arm-supporting rods with a series of sliding pivotal type-arms, spring-pawls for holding the type-arms at one end of said supporting-rods and reciprocating hooks or devices connected with the keys for pulling the type-arms one by one from behind said spring-pawl, substantially as specified.

5. The combination of a pivotal sliding type-arm C, with a supporting-rod B provided with a longitudinal groove or guide $b$, and a reciprocating hook-bar D sliding in said groove or guide, substantially as specified.

6. The combination with type-arms C provided with eyes or sleeves $c$, having notches or recesses $c^3$, of supporting-bar B provided with groove $b$, and sliding spring-bar D provided with upwardly-curved end bearing hook or projection $d$ to engage with said notches $c^3$ in said eyes $c$, substantially as specified.

7. The combination with parallel supporting-rods B, of type-arms C mounted loosely thereon, a device substantially as described for holding the type-arms not in use near one end of said supporting-rods, and a device substantially as described for pulling the type-arms one by one from behind such retaining device, substantially as specified.

8. The combination of parallel supporting-rods B with type-arms C mounted loosely thereon, a device substantially as described for holding the type-arms when not in use at one end of said supporting-rods, a device substantially as described for pulling them forward one by one, and a device substantially as described for elevating them into position for use in the line, substantially as specified.

9. The combination of parallel supporting-rods B, with type-arms C mounted loosely thereon, a device substantially as described for pulling the type-arms forward one by one, a device substantially as described for elevating them into position for use in the line and a device substantially as described for moving them longitudinally into their proper position in the line, substantially as specified.

10. The combination of parallel supporting-rods B, with type-arms C mounted loosely thereon, a device substantially as described for pulling them forward one by one, a device substantially as described for elevating them to the level of the line, a bed or support for the free end of the type-arms to rest upon and a device substantially as described for pushing the type-arms forward into position in the line, substantially as specified.

11. The combination with pivoted longitudinally-sliding type-arms C, of a movable bed or support G for the free end of the type-arms to rest upon when elevated into position for use, substantially as specified.

12. The combination of parallel supporting-rods B with type-arms C mounted to swing radially and slide longitudinally thereon, of spring-pawls $b^2$ for retaining said type-arms at the rear end of their supporting-rods, substantially as specified.

13. The combination of parallel supporting-rods B with type-arms C mounted to swing radially and slide longitudinally thereon, of spring-pawls $b^2$ for retaining said type-arms at the rear end of their supporting-rods, and springs $b^3$ for pressing the type-arms against said spring-pawls, so that the forward type-arm will always occupy the same position whatever may be the number of type-arms back of the spring-pawl, substantially as specified.

14. The combination of parallel supporting-rods B with type-arms C mounted to swing radially and slide longitudinally thereon, spring-pawls $b^2$ for retaining said type-arms at the rear end of their supporting-rods, and springs $b^3$ for pressing the type-arms against said spring-pawls, so that the forward type-arm will always occupy the same position whatever may be the number of type-arms back of the spring-pawl, and reciprocating hook-bar D for pulling the type-arms forward one by one, substantially as specified.

15. The combination of parallel supporting-rods B with type-arms C mounted to swing radially and slide longitudinally thereon, spring-pawls $b^2$ for retaining said type-arms at the rear end of their supporting-rods, and springs $b^3$ for pressing the type-arms against said spring-pawls, so that the forward type-arm will always occupy the same position whatever may be the number of type-arms back of the spring-pawl, reciprocating hook-bar D for pulling the type-arms forward one by one, and rotary sweeper-arms E for elevating the type-arms to the level of the line, substantially as specified.

16. The combination of parallel supporting-rods B, with type-arms C mounted to swing radially and slide longitudinally thereon, of spring-pawls $b^2$ for retaining said type-arms at the rear end of their supporting-rods, and springs $b^3$ for pressing the type-arms against said spring-pawls, so that the forward type-arm will always occupy the same position whatever may be the number of type-arms back of the spring-pawl, reciprocating hook-bar D for pulling the type-arms forward one by one, rotary sweeper-arms E for elevating the type-arms to the level of the line, and movable bed or support G for the free end of the type-arms to rest upon when the same are pushed forward off of said sweeper-arm, substantially as specified.

17. The combination of parallel supporting-rods B, with type-arms C mounted to swing pivotally and slide longitudinally thereon, a movable bed or support G on which the free ends of said type-arms rest when in use in the line, and a device for pulling the type-arms back to their original position when released, substantially as specified.

18. The combination of parallel supporting-rods B, with type-arms C mounted loosely thereon, and a reciprocating bar T for pulling or pushing the type-arms back to their original position, substantially as specified.

19. The combination of parallel supporting-rods B, with type-arms C mounted loosely thereon, a reciprocating bar T for pulling or pushing the type-arms back to their original position, and spring-pawls $b^2$ secured to a rocking or movable bar $b^4$ so that said spring-pawls may be elevated to permit the type-arms to pass under or back of the same, substantially as specified.

20. The combination of supporting-rods B, with type-arms C mounted loosely thereon, a reciprocating bar T mounted under said supporting-rods B for moving the type-arms back to their original position, spring-pawls $b^2$ secured to a rocking or movable bar $b^4$, mechanism substantially as described for elevating said pawls and releasing the same after the type-arms pass under them, and mechanism substantially as described for releasing the reciprocating bar T after the spring-pawls are let down upon the rods B, substantially as specified.

21. The combination of parallel supporting-rods B of type-arms C mounted loosely thereon, a device substantially as described for retaining said type-arms at one end of said rods, a device substantially as described for pulling them forward one by one, a device substantially as described for elevating them into position for use, and a pushing-bar H provided with pivoted fingers $h$ adapted to ride or drop over the type-arm and shove the same forward into its position in the line, substantially as specified.

22. The combination of parallel supporting-rods B, with type-arms C mounted loosely thereon, a device substantially as described for retaining said type-arms at one end of said rods, a device substantially as described for pulling them forward one by one, a device substantially as described for elevating them into position for use and a reciprocating pushing-bar H for moving the type-arm forward into position in the line and a cam or device $d^4$ to elevate said pushing-bar over the type-arms as it makes its backward reciprocation, substantially as specified.

23. The combination of supporting-rods B, with type-arms C mounted loosely thereon and provided with eyes $c$ surrounding said supporting-arms; a reciprocating bar H sliding on said rods B for moving said type-arms forward, and a cam or equivalent device $d^4$ for elevating said pushing-bar over the eye of the type-arm as said pushing-bar makes its backward reciprocation, substantially as specified.

24. The combination of supporting-rods B with type-arms C mounted to turn pivotally and slide longitudinally thereon, and provided with eyes $c$ sufficiently larger than said rods to permit the upper end of the type-arms to move forward the requisite distance without binding on said rod, though the lower end of said type-arm for the instant remains stationary, substantially as specified.

25. The combination of supporting-rod B with pivotal and sliding type-arms C mounted thereon, said type-arms C having an eye or sleeve $c$, the inner surface of which is curved or beveled substantially as shown at $c^5$, substantially as and for the purpose specified.

26. The combination of parallel supporting-rods B arranged part on each side of the line to be formed, with type-arms C mounted loosely thereon, and rotary sweeper-arms E, and mechanism substantially as described for operating the same in opposite directions when keys on different sides of the machine are depressed, substantially as specified.

27. The combination of parallel supporting-bars B, with type-arms C mounted loosely thereon, devices substantially as described for pulling said type-arms forward one by one, keys and suitable connecting mechanisms substantially as described for operating said devices, sweeper-arms E for elevating the type-arms, mechanism substantially as described for operating said sweeper-arms by power, and suitable connecting mechanism substantially as described for releasing or setting said operating mechanism in motion by the movement of the keys, substantially as specified.

28. The combination of pivoted type-arms C with a device substantially as described for elevating the same into position for use, mechanism substantially as described for operating the type-arm elevating device by a weight or other power, and devices substantially as described actuated by the key for releasing or setting such operating mechanism in motion, substantially as specified.

29. The combination of pivoted type-arms C mounted part on each side of the machine, a rotary device substantially as described or sweeper for elevating said type-arms, mechanism substantially as described actuated by a weight or power for operating said rotary device or sweeper, and devices substantially as described actuated by the keys for releasing or setting such operating mechanism in motion in opposite directions when keys on opposite sides of the machine are depressed, substantially as specified.

30. The combination of parallel supporting-rods B, with type-arms C mounted loosely thereon, devices substantially as described for pulling said type-arms forward one by one, keys and suitable connecting mechanisms substantially as described for operating said devices, sweeper-arms E for elevating the type-arms, a pusher-bar H for moving said type-arms forward into position in the line, mechanism substantially as described for operating said sweeper-arms and pusher-bar by power, and suitable connecting devices substantially as described for releasing or setting said operating mechanism in motion by the movement of the keys, substantially as specified.

31. The combination of pivoted type-arms C, with a device substantially as described for elevating the same into position for use, a device substantially as described for pushing them forward into position in the line and mechanism substantially as described for operating the type-arm-elevating device and said pushing device by a weight or other power, and devices substantially as described actuated by the movement of the key for releasing or setting such operating mechanism in motion, substantially as specified.

32. The combination of pivoted type-arms C, mounted part on each side of the machine, a rotary device substantially as described or sweeper for elevating said type-arms, a pusher-bar H for moving said type-arms forward, mechanism substantially as described actuated by a weight or power for operating said rotary device or sweeper and said pusher-bar, and devices substantially as described actuated by the keys for releasing or setting such operating mechanism in motion in opposite directions when keys on opposite sides of the machine are depressed, substantially as specified.

33. The combination of pivoted and sliding type-arms C, with a device or pusher-bar H for moving the same forward into position in the line, mechanism substantially as described for operating said type-arm-moving device by a weight or other power, and devices substantially as described actuated by the key for releasing or setting such operating mechanism in motion, substantially as specified.

34. The combination of swinging and longitudinally-sliding type-arms C, rotary sweeper E, and movable bed or support G for the free end of the type-arms arranged in juxtaposition, and on about a level with said rotary sweeper when the same is elevated, substantially as specified.

35. The combination with swinging type-arms C, arranged part on each side of the machine, of a movable support or bed G for the free end of the type-arms arranged near the middle of the machine, said support G extending transversely to said type-arms and vibrating or moving in and out transversely to said type-arms, substantially as specified.

36. The combination of swinging type-arms C, with movable support G and a device substantially as described for gradually lowering the type-arms to a pendent position when said support is removed, substantially as specified.

37. The combination of supporting-rods B, type-arms C, movable support G, roller J and mechanism substantially as described for moving said roller up under the type-arms before said support G is removed and gradually lowering the same on an angle of about forty-five degrees, substantially as specified.

38. The combination of supporting-rods B with type-arms C and movable fingers S for separating the several different sets of type-arms as the same are moved back, substantially as specified.

39. The combination of parallel supporting-rods B, with type-arms C and reciprocating pivoted fingers S, supported in front of the pivots on a movable bar, so that said pivoted fingers may be inclined, substantially as specified.

40. The combination of supporting-rods B with type-arms C, reciprocating finger-bar S', fingers S pivoted thereto and supporting-bar S pivoted at its inner end near the shorter type-arms, so that said fingers may be inclined according to the length of the different sets of type-arms, substantially as specified.

41. The spacing device consisting of the hinged levers I, I and the type in a line in combination with the type-arms to which said type are attached, substantially as specified.

42. The combination of spacing device consisting of hinged leaves I, I', with a movable bar for applying pressure to said hinged leaves to spread the same, substantially as specified.

43. The combination of hinged leaves I, I', with reciprocating bar $I^5$ to which said leaves are pivoted and mechanism substantially as described actuated by a key for pulling said bar forward, substantially as specified.

44. The combination of hinged leaves I, I', with bar or plate $I^5$ provided with stops or projections $i^4$ $i^5$ to prevent said leaves closing in the wrong direction when pressure is applied, substantially as specified.

45. The spacing device, consisting of the hinged leaves I, I', having beveled ends $i^3$, so that the pressure applied will tend to close the same when extended straight, substantially as specified.

46. The combination of hinged leaves I I', plate $I^5$ to which said leaves are pivoted, reciprocating bar $I^4$, key $I^2$ and lever $I^3$, substantially as specified.

47. The combination of hinged leaves I, I', plate $I^5$ to which said leaves are pivoted, reciprocating bar $I^4$, key $I^2$, lever $I^3$ and spring $i^2$ substantially as specified.

48. The combination with spacing devices consisting of hinged leaves I, I', of movable bar $L^4$ resting upon the upper edge of said spacing devices, and means substantially as described for actuating said bar from the impression-bed as the latter descends to take the impression, substantially as specified.

49. The combination with spacing devices I, I', of hinged plate or bar $L^4$ provided with crank $l^4$, and impression-bed M provided with projection or arm $m$ engaging said crank-arm $l^4$, substantially as specified.

50. The combination with spacing devices I, I', of hinged plate or bar $L^4$ provided with crank $l^4$, and impression-bed M, provided with spring tappet or arm $m$, adapted to yield to permit the impression-bed to descend farther to take the impression after actuating the spacing devices, substantially as specified.

51. The combination with a bed or support for the type-arms, of a straightening-bar L on one side of the line, a vertically and horizontally moving straightening-bar L' on the opposite side of the line and means substantially as described for actuating said bar from the impression-bed as it descends to take the impression, substantially as specified.

52. The combination with a bed or support for the type-arms, of a fixed straightening-bar, a horizontally-moving straightening-bar and means substantially as described for actuating the same from the impression-bed, substantially as specified.

53. The combination of a support or bed for the type-arms, with a vertically-moving bar for leveling the face of the type, and means substantially as described for actuating said bar from the impression-bed, substantially as specified.

54. The combination with horizontally and vertically moving straightening-bar L', having inclined rear face $l^5$, of stationary bar $L^5$ having incline $l^6$, rotary cam-shaft $l^7$ and a projection $l^8$ on said movable bar L' for said cam to impinge against, and a crank-arm $l^{10}$, and the impression-bed provided with a spring-tappet $m'$, substantially as specified.

55. The combination of swinging type-arms C arranged part on each side of the machine, with a bed or support for the free end of said arms near the middle of the machine, and a vertically-moving bar L' to level the face of the type, the type-arms on one side of the machine being provided with heels or projecting ends $c^4$ for said bar to bear against, substantially as specified.

56. The combination of revolving sweeper-shaft E' with weight 2 and intermediate mechanism substantially as described for revolving said shaft in either direction, substantially as specified.

57. The revolving sweeper-shaft E', having the disk or wheel 15 secured to it, in combination with pawl 25 for stopping said shaft after making a whole or a partial revolution, substantially as specified.

58. The revolving sweeper-shaft E' in combination with pawl 25, key-lever $D^2$, and intermediate connections substantially as described for operating said pawl at each depression of said key, substantially as described.

59. The revolving sweeper-shaft E' in combination with pawl 25, rocking frame $D^5$ and intermediate connection substantially as described for releasing and stopping said shaft at each depression of a key-lever, substantially as described.

60. The combination of revolving sweeper-shaft E' weight 2, gear 6, operating-pinion 8, with pin 12 or equivalent device for releasing and stopping the revolution of said pinion at each whole or partial revolution, substantially as specified.

61. The combination of revolving sweeper-shaft E' weight 2 suspended from an endless chain running in opposite directions over pin-gears 4 and 5, with gears 6 and 7, pinions 8 and 9, pins 12 running in appropriate bearings in wheels 10 and 11 secured to said pinions 8 and 9, respectively, for operating said wheels 10 and 11 in opposite directions, substantially as described.

62. The combination of revolving shaft E' having disk or wheel 15 secured to it weight 2, gear 6, pinion 8, wheel 10, pin 12 or equivalent device with key-lever $D^2$ and connections substantially as described for releasing said pin, thus allowing said wheel 10 to revolve, by depressing said key-lever, substantially as specified.

63. The combination of revolving sweeper-shaft E' weight 2, gear 6, pinion 8, wheel 10, and pin 12, with disk 15 secured to shaft E' and containing appropriate holes or slots for receiving said pin 12 as it is released by depressing a key-lever, thereby causing said shaft to revolve, substantially as specified.

64. The combination of revolving sweeper-shaft E' wheel 10, pin 12 and disk 15, with parallel guard-plate 24 for keeping said pin 12 in the hole or slot in said disk 15, until the desired revolution of the shaft E' has taken place, substantially as described.

65. The combination of wheel 8 with pushing-bar H and intermediate mechanism substantially as described for giving said pushing-bar a reciprocating movement at each whole or partial revolution of said wheel, substantially as described.

66. The combination of the roller K, arms K' and $K^2$ hinged at $K^3$, with mechanism substantially as described for moving said roller at an angle of about forty-five degrees by swinging said arm $K^4$ on its supporting-shaft $K^5$ from about a horizontal to about a vertical position, substantially as described.

67. The combination of the arm K' with the arm $K^2$ hinged at $K^3$, with beveled segments $k^9$ and $k^{10}$, lever $k^{12}$ and cam $k^{13}$ for making the free end of arm K' describe a particular path deviating from the circular by swinging the arm $K^2$ from a vertical to a horizontal position, substantially as described.

68. In a machine for the purpose stated, the combination with the type-arms and their support of a hinged impression-bed and two mechanisms for imparting to said impression-bed its movement one mechanism for swinging it quickly from a vertical to a horizontal position and an auxiliary mechanism substantially as specified for producing great pressure at the point of contact between the types and the matrix or mold carried by said impression-bed whereby the machine is adapted to operate with rapidity and at the same time exert the great pressure required for taking the impression of a whole line at a time, substantially as specified.

69. In a machine for the purpose stated, the combination of the type and type-arms and their supporting-bed, of a movable impression-bed carrying the matrix or mold and two separate mechanisms for imparting to said impression-bed its movements one of said mechanisms consisting of a foot-lever and connections substantially as described, for swinging said impression-bed down to bring the matrix in contact with the type, and the other of said mechanisms being an auxiliary mechanism, substantially as described, for exerting great pressure at the point of contact between the types and the matrix carried by said impression-bed, substantially as specified.

70. The combination of the impression-bed M with the foot-lever N, grappling-hooks $o$ and $o'$, toggle-levers $o^4$, $o^5$, and $o^6$, and connecting-rods $o^3$ and $o^7$, substantially as and for the purpose described.

71. The combination of the impression-bed M, foot-lever N, segment $n'$, gear $n^2$, and pitman $n^5$, substantially as and for the purpose set forth.

72. The combination of leading-screw $q$ with threaded gear $q'$, impression-bed M and mechanism substantially as described for moving said screw longitudinally by the upward and backward movement of the impression-bed, substantially as and for the purpose described.

73. The combination of the movable type-supporting bed G with the cam-shaft $M^3$ and connecting mechanism, substantially as and for the purpose described.

74. The combination of the bar T with the cam-shaft $M^3$ and connecting mechanism, substantially as and for the purpose specified.

O. M. PETERSON.
CHRISTIAN C. HILL.

Witnesses:
H. M. MUNDAY,
EDMUND ADCOCK.